United States Patent [19]
Fehr

[11] Patent Number: 5,580,599
[45] Date of Patent: Dec. 3, 1996

[54] PROCESS AND DEVICES FOR MECHANICALLY PRODUCING PRETZELS

[75] Inventor: Werner Fehr, Krumbach, Germany

[73] Assignee: Muk Metall-Und Kunststoff-Vertriebs GmbH, Germany

[21] Appl. No.: 157,056

[22] PCT Filed: Apr. 2, 1993

[86] PCT No.: PCT/EP93/00817

§ 371 Date: Feb. 16, 1994

§ 102(e) Date: Feb. 16, 1994

[87] PCT Pub. No.: WO93/19607

PCT Pub. Date: Oct. 14, 1993

[30] Foreign Application Priority Data

Apr. 2, 1992 [DE] Germany ............... 42 11 043.2

[51] Int. Cl.⁶ ........................................ A21C 3/08
[52] U.S. Cl. .................. 426/499; 426/500; 426/512; 426/517; 425/323; 425/391; 425/403; 425/470; 53/744; 53/748; 414/794; 414/794.2; 198/418.6; 198/468.8
[58] Field of Search ........................ 426/499, 500, 426/512, 514, 517, 143; 425/323, 391, 403, 470; 99/353; 53/244, 248; 198/418.6, 468.8; 414/794, 794.2

[56] References Cited

U.S. PATENT DOCUMENTS

| 3,392,853 | 7/1968 | Mitchell et al. ......... 414/794.2 X |
| 3,511,189 | 5/1970 | Schafer .......................... 425/391 |
| 4,019,621 | 4/1977 | Honson ........................ 198/418.6 |
| 4,026,421 | 5/1977 | Lotz ............................ 414/794 X |
| 4,984,677 | 1/1991 | Prakken ...................... 198/418.6 |
| 5,009,910 | 4/1991 | Zwicker ...................... 425/323 X |

FOREIGN PATENT DOCUMENTS

| 0382219 | 8/1990 | European Pat. Off. . |
| 221845 | 3/1909 | Germany . |
| 457308 | 2/1928 | Germany . |
| 576788 | 5/1933 | Germany . |
| 1179884 | 10/1964 | Germany . |
| 1285424 | 12/1968 | Germany .............. 426/499 |
| 1782289 | 8/1971 | Germany . |
| 2731997 | 1/1979 | Germany . |
| 3208105 | 9/1983 | Germany . |
| 3903701C1 | 2/1989 | Germany . |
| 3900950 | 7/1990 | Germany . |
| 3906310 | 9/1990 | Germany . |
| 3939013 | 5/1991 | Germany .............. 425/323 |
| 470839 | 5/1969 | Switzerland . |
| 9403068 | 2/1994 | WIPO .................. 425/323 |

Primary Examiner—Esther M. Kepplinger
Assistant Examiner—Milton I. Cano
Attorney, Agent, or Firm—Sterne, Kessler, Goldstein & Fox P.L.L.C.

[57] ABSTRACT

An improved method and device for mechanically producing pretzels. The method and device produces strings of dough having precisely predetermined cross-sectional and longitudinal dimensions. The invention provides a high throughput rate of pretzels and low rejection rate, together with simple operability, such that the device is cost-effective even in small bakeries.

74 Claims, 22 Drawing Sheets

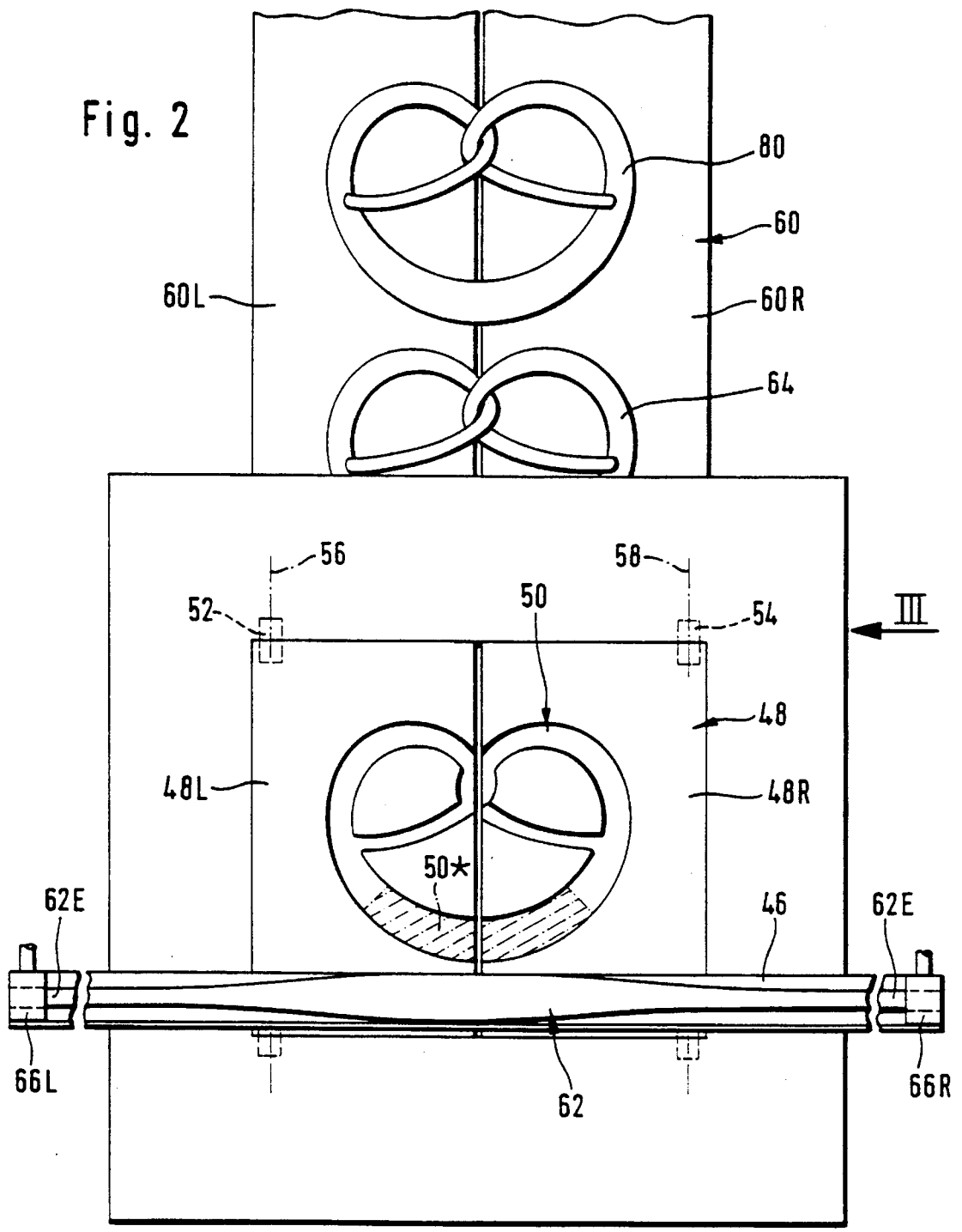

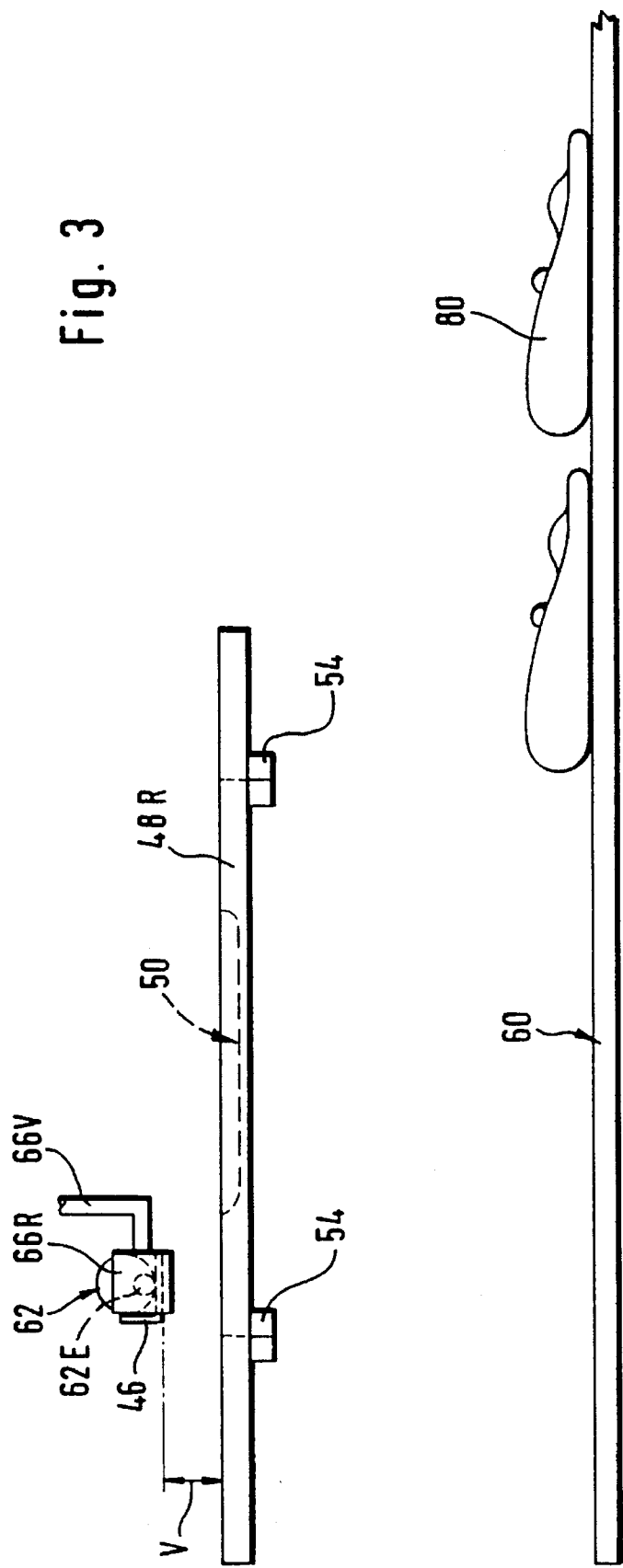

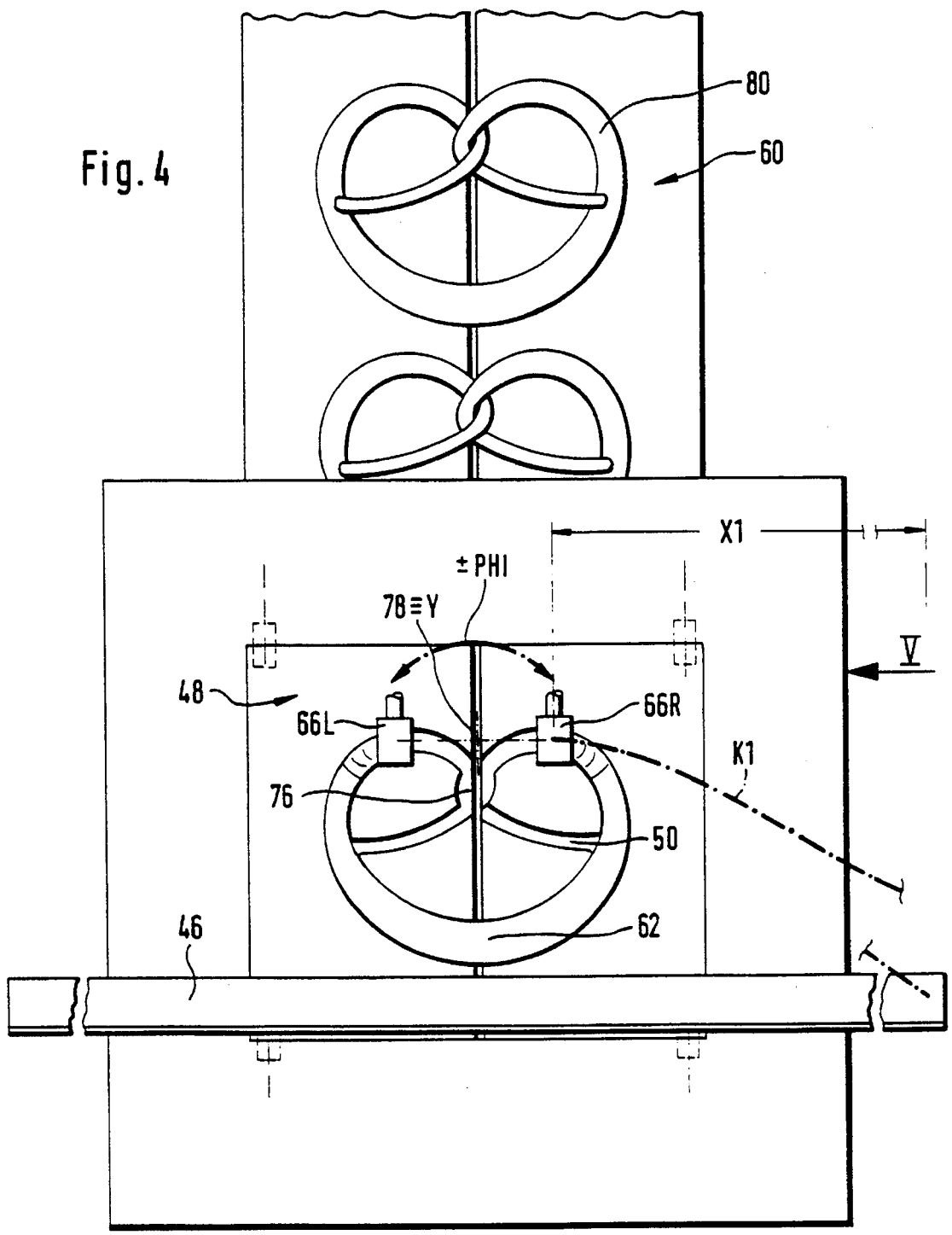

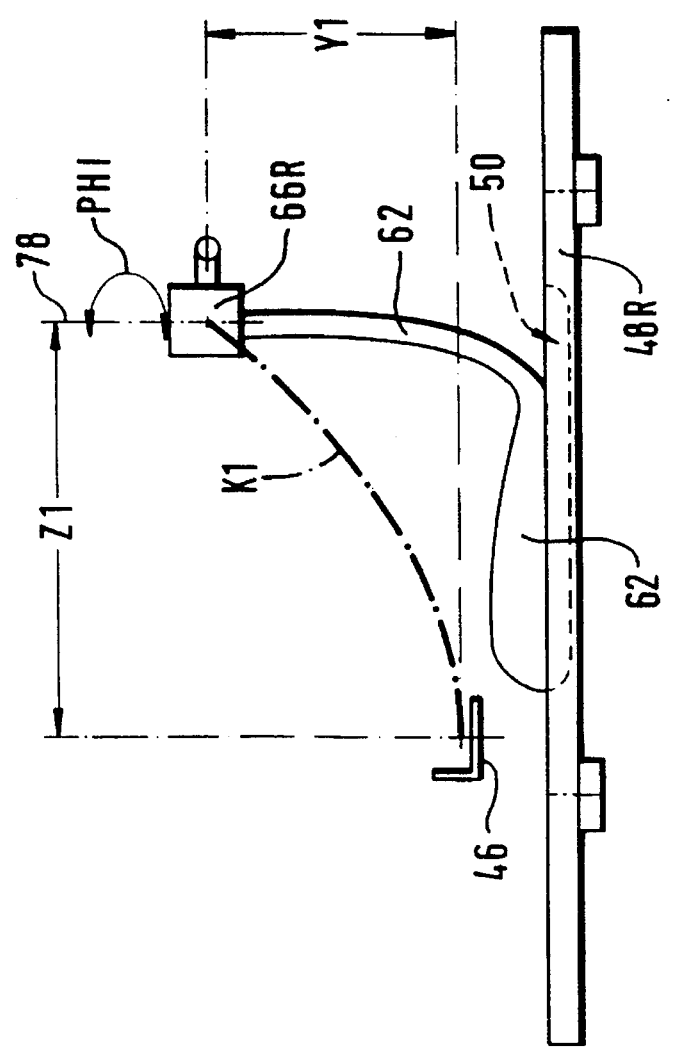
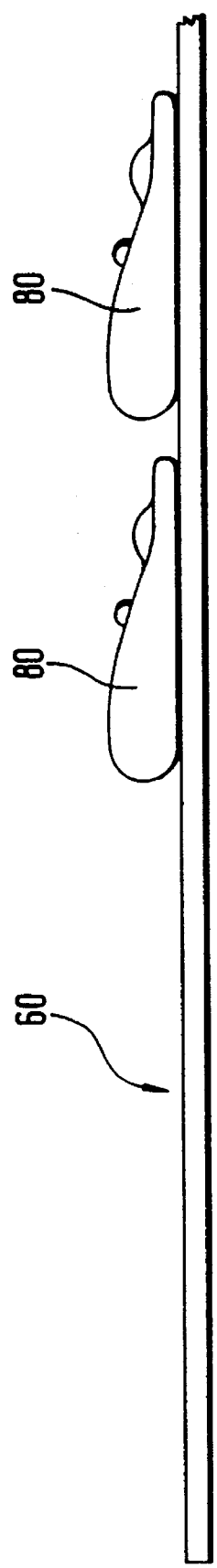

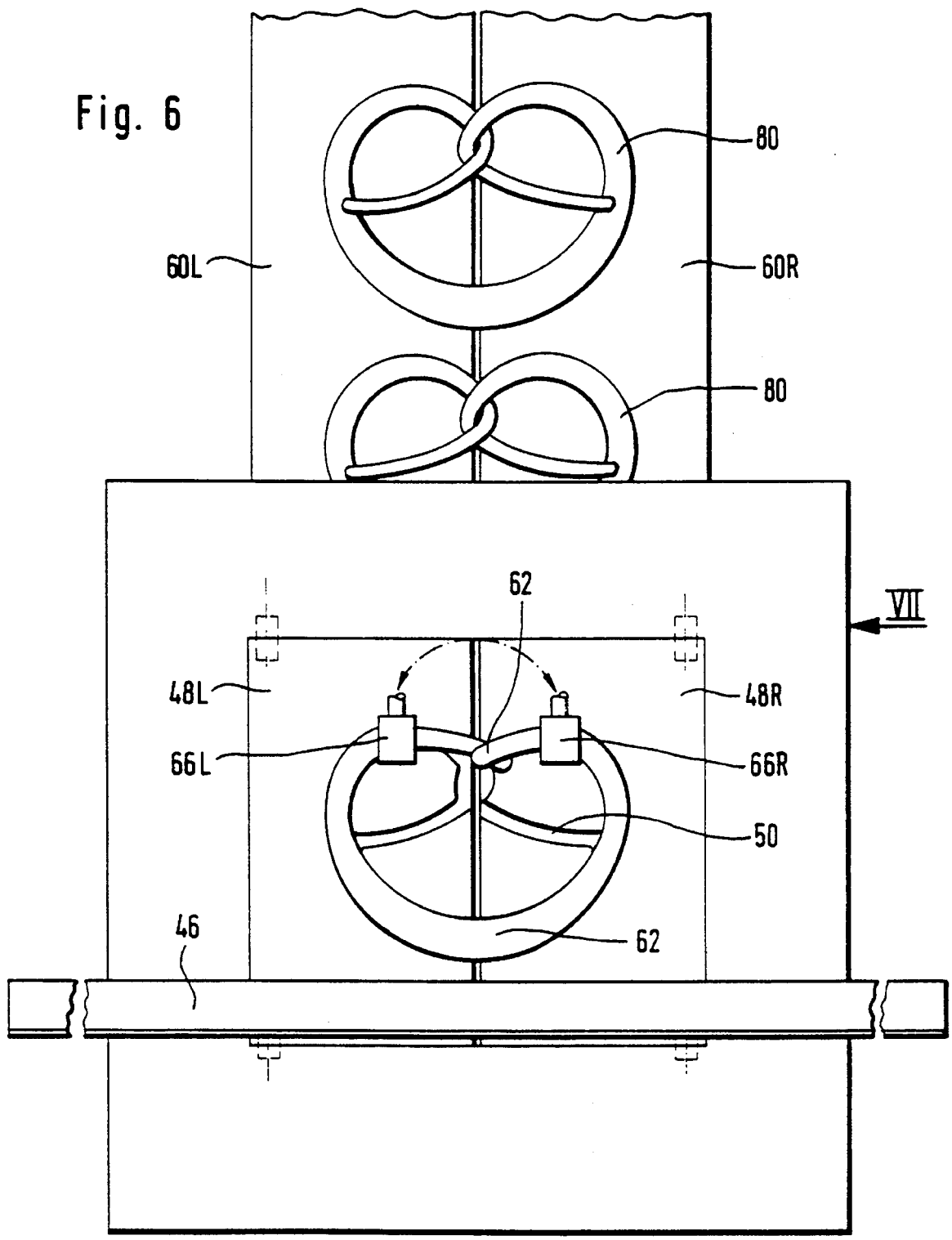

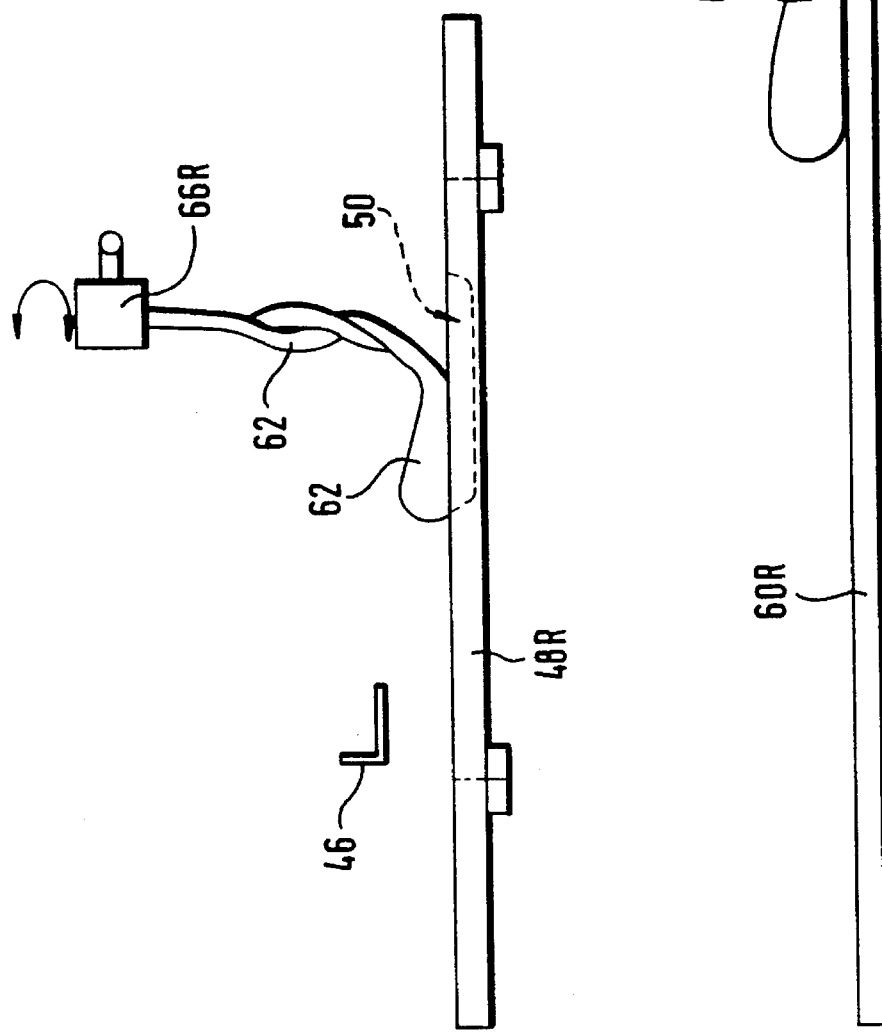

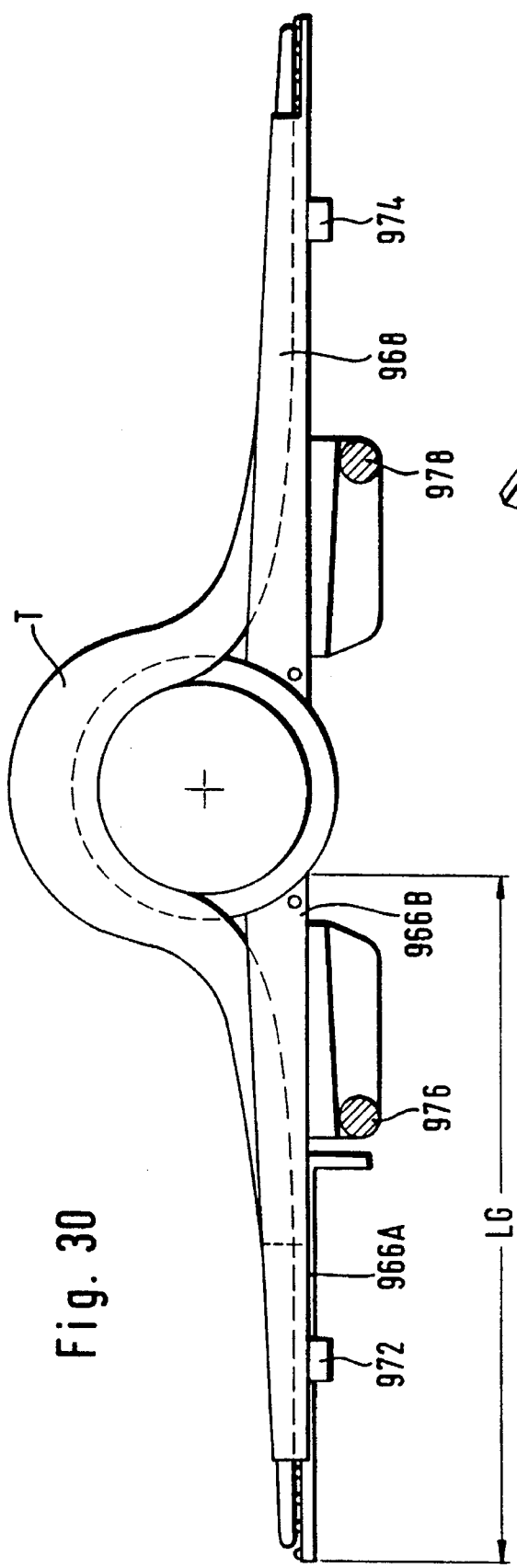

PROCESS AND DEVICES FOR MECHANICALLY PRODUCING PRETZELS

The invention relates to a process for the mechanical production of pretzels from a portion of dough, a device for implementing such a process, and a process and a device for producing a piece of dough in the shape of a string of dough having predetermined cross-sectional and longitudinal dimensions.

Various attempts have been made towards automated pretzel production in a form that would be profitable for small bakeries, as well. Considering the comparatively high labor costs, it must presently be assumed that the actual production costs in manual production cannot be passed on through the sales price of the baked goods.

Automated production lines for pretzels as currently marketed either work to produce high reject rates, or else their high price of acquisition is worthwhile only at extremely large numbers of pieces.

Although attempts at finding solutions for the mechanical production of pretzels were undertaken very early on in order to reduce the time and labor expended in their production, the attempts having hitherto become known are throughout tainted by deficiencies which hardly allow an economical use of known devices, especially not for small bakeries. Particularly for such enterprises a maximum degree of simplicity and operational safety of the construction and its control are important, with a maximum degree of serviceability and cleanability being expected, while its operation should be possible for untrained hands. Known devices are not suited for the following reasons.

From DE-AS 1782289, a pretzel knotting device became known the kinematics of which emulate the pretzel knotting process in manual production. Herein it is a prerequisite that the string of dough forming the starting point for the pretzel knotting process should come to lie on a support in a precisely determined alignment and shape, such that the grippers which are supported by coaxial shafts grasp the thinner ends of the string and, in cooperation with particularly shaped retaining grippers, are able to carry out the knotting process in such a manner that upon its completion, the ends of the string come to lie precisely on the intended locations in the area of transition to the centerpiece of the pretzel. In view of the fact that the ends of the string are generally essentially thinner than the centerpiece of the string, use of this known knotting device results in a relatively high reject rate, with the prior art furthermore neither providing an approach to achieve precise positioning of the string of dough, nor consecutive transport of the knotted raw pretzel.

These disadvantages were recognized early on, and in DE-OS 27 31 997, a process and device for producing such pretzels are described whereby knotting the string of dough into a pretzel shape was to be carried out more gently. This known device concurrently attained the object of conveying the raw pretzel on as gently as possible. The knotting support, which for this purpose was designed in two parts, was supplied with two pivoting axes which were released after the knotting process was completed, such that the knotted pretzel could drop downwards. The support trapdoor opening in this way was, however, static during the pretzel knotting process, such that the string of dough had to be dragged over a considerable distance during the knotting process. As a consequence, a layer of dough continuously builds up on the support even when only a small number of pretzels are knotted, eventually disrupting the mechanical knotting process. As furthermore in these known kinematics, an action for conveying the string of dough had to be carried out in synchronicity with the pivoting motion of the knotting body, this known process, or this known device, was not successful due to this lack of synchronising ability for these actions.

Attempts were also made since early on to subject the kinematics of the knotting process to a variation. As a rule, such variations brought about a very complex moving mechanism for the single functional parts of the device as e.g. shown in DE 45 73 08, which thus also was very prone to malfunction.

From DE-OS 22 18 45, an automatic machine for shaping pretzels is known, wherein a string of dough rolled in its length is moved by a conveyor belt towards a pad curved in the shape of an arc, such that the string of dough initially bends around the pad in the shape of an arc, and the ends of the string of dough are grasped by another driven support aided by guiding plates. After the string of dough has been brought into the shape of a U, the ends of the string of dough are fixated by means of a pressure roll, and a frame receiving the second moving support is turned through 360°, whereby the ends of the string of dough are twisted. Finally the arc-shaped portion of the pretzel is folded over in the direction of the two free ends, with the pressure roll previously being raised such as not to obstruct the procedure of pressing the ends of the string of dough onto the central portion of the pretzel. In this process, the raw pretzel is subjected to considerable accelerations rendering precise positional alignment of the raw pretzel difficult, such that further processing is only possible through additional expense. Here, too, the raw pretzels are positioned "face down" after leaving the pretzel knotting device, such that further handling of the raw pretzel in the fabrication process, which comprises a multiplicity of further processes such as lye treatment, salting and, in a given case, applying a cut in the area of the more voluminous central portion of the pretzel, is rendered difficult.

In the case of the pretzel knotting device according to DE-OS 39 06 310, the knotted pretzel does not lie "face down", however the problem of pretzel transport by the device may only be solved by means of a relatively expensive frame construction in this known case. A separate frame together with a corresponding drive mechanism is required for each pretzel to be knotted in the pretzel knotting device, with the problem of positioning the string of dough also not being solved in this known device. Neither is there a solution indicated in this known device for the problem of how to hold the ends of the string of dough, or the string of dough itself, on the shaping panel in a positionally true manner. Here it must be taken into consideration that adhesive forces must not be used if only for reasons of hygiene. It can furthermore be seen that it is basically difficult to deposit the loose ends of the string of dough on the central portion of the pretzel by means of a trapdoor after the knotting process, as the acceleration and centrifugal forces involved result in more or less uncontrolled movement of the ends of the string of dough. The problem of removing the raw pretzels from the knotting device is not solved, either. Furthermore it can be seen that the frames passing through the pretzel knotting device require a lot of space and are only conditionally suited for use in a bakery, if only due to the fact that they easily catch dust and are difficult to clean.

DE-OS 32 08 105 shows an even more complex structure of a device for knotting the pretzel shape. In this variation, the axis of the turning movement through 360° is again positioned within the plane of the string of dough bent into the shape of a "U". A relatively complicated mechanical structure is required to initially give the string of dough a shape resembling an Omega, then carry out the knotting process, and finally fold over one half of the piece of dough. Apart from the fact that the mechanical means provided herefor work relatively slowly, this known process on the other hand has the disadvantage that there are no means whereby a pre-shaped string of dough may be passed onto the knotting device itself. Furthermore this known machine for shaping the string of dough into a pretzel did not solve the problem of further conveying the pre-shaped raw pretzel to the downstream workstations in the bakery. Because strong accelerations of the string of dough are involved, uncontrolled deformations and therefore a certain reject rate cannot be precluded. This device, as well, was therefore not able to gain a position on the market.

From DE 39 03 701, or from EP 0 382 219 A1, another process for forming pretzels has become known whereby the number of device components is to be reduced and kinematics are simplified. Herein the ends of the string of dough are initially grasped by two adjacently arranged gripping bands which move the string of dough in the production direction. While advancing, the support gradually lowers, such that the string of dough between the ends acquires a loop shape. By means of inversely driven, brush-shaped rollers, the loop is twisted by 360° in relation to its ends. The piece of dough then arrives at a conveying surface rising in the way of a ramp, the moving speed of which is adjusted such that folding over of the twisted end portions of the piece of dough onto the central portion ensues. The grasping bands for the ends of the string of dough subsequently move apart by a small amount. As soon as the ends of dough come to lie above the intended locations of connection to the central portion of the pretzel, the strings of dough are released in order to let them sink down onto the central portion of the pretzel. Apart from the use of brushes not being recommendable in bakeries for reasons of hygiene, a number of technical uncertainties must be feared in this known process, originating from excessively large forces, e.g. centrifugal and gravitational forces taking effect on the relatively delicate string of dough. Neither was there a solution to the problem of defined supply of the string of dough to the knotting device proper. Depositing the ends of the string of dough furthermore takes place in a rather uncontrolled manner, resulting in undesirable reject rates.

The same is true analogously for the pretzel knotting machine according to DE-AS 1179884. According to this process, a string of dough deposited in a depression is grasped by two suction nozzles provided at the ends of two pivoting levers, respectively, which are then pivoted towards each other in synchronicity. Here the string of dough is to position itself in an arc shape around a slightly curved support surface formed on a rotating table. As soon as the pivoting arms reach a position in the vicinity of the axis of rotation of the rotating table, the latter carries out a rotating motion through 360°, whereupon the pivoting arms are pivoted away from each other until the ends of the string of dough reach the intended position above the central portion of the pretzel. The pivoting arms are held movably along their axes, such that it becomes possible to press the ends of the string of dough onto the central portion through the lowering movement of the pivoting arms. Apart from the fact that a mere inverse movement of the pivoting arms towards each other may bring the string of dough into an arcuate shape—without breaking it—only if the dough has a certain consistence, the main disadvantage of this known pretzel knotting machine resides in the fact that operation suited for victuals is not possible. Even suction grasping of the string of dough by means of low pressure either results in an insufficient grasping force or in excessively strong sucking of the dough, such that final deposition or dropping of the ends of the string of dough may not be carried out without problems. The mechanical structure is furthermore rather complex, thus preventing economic produceability of the device. Finally in this known case, as well, production and deposition of the string of dough on the one hand, and of the completely knotted raw pretzel on the other hand was not solved reproduceably.

From DE-OS 39 00 950, another process for producing pretzels and a device for implementing this process are known, wherein the central portion of a string of dough positioned transversely with respect to the advancing direction is grasped at essentially its center and lifted up somewhat by a scoop-shaped part. Then the scoop-shaped part performs a rotating movement through 360°, with the ends of the string to remain fixed by self-friction. After the rotating motion is completed, the central portion may be lowered again, permitting it to drop onto the ends of the string of dough, if dimensioning and maintained dimensions as well as synchronisation of the single motions are suitable. The advantage of this device is its relatively simple sequence of motions. Under practical conditions, however, it may be seen that the string of dough easily warps under this treatment. It is also difficult to appropriately further process the pretzel lying "face down" at the output of the knotting device.

From DE 57 67 88 finally, a process for the mechanical production of pretzels from a portion of dough is known. In this device, the folding motion between the braided ends of the string of dough around the central portion of the pretzel, which was described above and which exerts a relatively strong strain, was done away with. Instead the string of dough having tapering ends, which was dropped by a device for producing a string of dough, is conveyed such as to arrive in a transverse position before a retaining block of a conveyor belt, which in cooperation with a pair of guide pieces brings the string of dough into the shape of a "U". Subsequently the ends of the string of dough are grasped by a pair of grippers having a common axis of rotation. The distance between the grippers corresponds to the opening in the "U". During transport, the pair of grippers is rotated through 360°, with the grippers holding the ends of the string of dough previously being raised. Upon completed rotational motion, the grippers are lowered again and the ends of the string of dough are dropped and pressed against the central portion of the pretzel.

This device presents the disadvantage that despite a relatively expensive mechanical construction, the mutual distance between the grippers is determined to be the width of the central portion of the pretzel. The knotting process thus necessarily results in strongly varying stretching strain of the string of dough, as a consequence making it difficult to obtain a symmetrical shape of the pretzel. It should also be noted that excessive deformation of the dough affects the quality of a pretzel. Finally this device is equally not capable of lowering the reject rate below a value just about acceptable for a small bakery. In the known case, the construction of the grippers is furthermore such as not to suffice the demands to technical hygiene which meanwhile have risen sharply.

The above shows that in spite of the multiplicity of approaches for finding an economic solution to the problem of mechanical pretzel production, it was hitherto not possible to provide a process and a device capable of obtaining the completed pretzel shape at high throughput rates and low reject rates together with simple operability and controllability of the device, whereby use of such machines would be cost effective even in small bakeries.

The invention is therefore based on the object of furnishing a process and a device for the mechanical production of pretzels, which are characterized by maximum operational reliability and performance, with the control and operation having to be as simple, and the handling of the dough as gentle as possible, and the criteria of hygiene and baking technology attainable without problems.

Whereas attention has hitherto rested on single stations in the mechanical production of raw pretzels—as documented by the prior art—harmonization of single processes starting with the production of a string of dough over the knotting process to deposition of the shaped pretzel is optimized according to the invention. The invention accordingly is the result of comprehensive analytic efforts yielding the result that the combination of features of a solution according to the invention provides a work process which takes into account the environment and the given targets of the bakery, and which ensures high quality of the pretzels on the one hand and high productivity of the installation on the other hand.

The invention teaches a working process and provides an installation for the mechanical production of pretzels whereby not only individual problems, e.g. the pretzel knotting process, but all of the working steps decisive in mechanical production, such as e.g. supplying the string of dough and deposition of the knotted pretzel, are optimized. Here the invention is initially based on the insight that it is quite decisive for good reproduceability of the knotting process that the string of dough passed on to the pair of grippers should have a precisely controlled length and alignment. Only thereby is it guaranteed that the ends of the string of dough are precisely in the desired positions after completion of the knotting motion. Due to the fact that, according to the invention, the grippers pull the properly grasped string of dough into a defined loop shape in a continuous sequence of motions symmetrically to the plane of symmetry of the pretzel, with the central portion of the loop being supported either positively or by frictional force at the device or at an arc-shaped support surface corresponding to the finished pretzel shape, the prerequisite for the loop to maintain its shape and position during the knotting process is created, such that the position of the grippers in relation to the loop is securely under control throughout the sequence of motions. According to the invention, not the support but the assembly of grippers is rotated. This advantageously introduces the possibility of incorporating the support used during the knotting process into the conveying process to deliver the completely knotted pretzel to the downstream transport device. According to the invention, the completely knotted, raw pretzel is transported from the range of the knotting device in parallel translation. In this manner, the raw pretzel is treated as gently as possible in this stage, as well, and when emerging from the pretzel knotting device it is present on a transport device in such precise alignment that further processing, such as filling batches onto baking trays, may ensue without any problems. It was found that with the process according to the invention, it is easily possible to produce 700 pretzels per hour in an entirely automated manner, with the additional advantage that the dough is subjected to relatively small external forces. The effect is not only a positive one for the quality of the baked article, but also ensures ever the same shape of pretzels. Thus the process according to the invention is lucrative also for small bakeries, as with the installation according to the invention, one worker may be rationalized at a production rate of only 2,000 pretzels a day.

One particularly advantageous embodiment of the device for implementing the process includes a setup having extremely short lifting motions of the means for conveying and handling the string of dough may be achieved, additionally yielding the advantage of very easy control. The single components of the device are furthermore easy to clean, thereby easily fulfilling the requirements to technical hygiene. Gravity is advantageously applied in processing inside the pretzel shaping machine, whereby the power consumption of the device may be decreased and the operating speed may be raised. In particular as the grippers according to the invention are supported at the transverse member which is equipped with a rotational and lift drive, the requirements for the knotting device being capable of being integrated in a baking line while using minimum constructing space are met. As the grippers are suspended at the transverse member, this latter one may easily be arranged above a device for supplying the string of dough, i.e. a so-called longitudinal roller. After the grippers have gripped the ends of the string of dough and advanced towards the inside near the so-called pretzel "heart", the rotational motion required for the knotting process may be carried out immediately, as the distance of the grippers from the rotational axis is already small enough at this time to remain entirely outside the longitudinal roller, and as on the other hand the transverse member is in any case positioned above the longitudinal roller, such that free rotation is possible.

Production may be further simplified by means of a variation of the invention. The distance to be covered by the completely knotted raw pretzel in successive timings is kept very short via the series of intermediate buffers, whereby the advancing velocity of the raw pretzels may also be reduced. This results in even more gentle treatment of the pieces of dough and furthermore in the device being subjected to smaller strains, thereby extending its service life.

In one embodiment of the present invention, a single person is enough for operating the entire installation. Here it could be found that the work expended in pretzel production could be reduced to approximately 20% of the expense in manual production.

The conveyor for supplying the completely knotted raw pretzels to further processing in the baking line is preferably preceded by an intermediate storage support. This intermediate storage support preferably has a length with corresponds to the width of the conveyor, i.e. the width of a conveyor belt or a baking tray.

The baking support in the form of a baking tray or a conveyor belt is preferably driven in steps, such that the raw pretzels dripping, as it were, from the intermediate storage support instantaneously fill one line on the baking tray or baking support.

Thanks to the defined and symmetrical motion for driving the ends of the string of dough, it proved to be sufficient if the string of dough, which was pulled onto the support by means of the grippers, is kept in position by frictional force only. Among others, this is due to the fact that the knotting process is carried out only when the ends of the string of dough are positioned essentially above the "heart" of the pretzel. An additional advantage is the possibility of further raising the advancing velocity of the grippers without affecting the accuracy of positioning the central portion of the pretzel.

If the rotational drive for the gripper transverse member is associated with a reversing device sliding contact rings may be done away with in the area of the rotational drive, whereby a positive effect on operational reliability of drive and control is achieved.

The single drives for movable components may be provided with different energy sources. Particularly advantageous, however, is the use of stepping motors. Such stepping motors meanwhile as a rule have very high resolutions whereby positioning accuracy of the grippers may be further increased.

Due to inverse and symmetrical motion control of the grippers and due to the rotational drive being suspended on the transverse member together with the retaining head, a single drive motor is sufficient for each axis of movement. The device thereby acquires a particularly compact and simple structure.

The process according to the invention and the construction of the device according to the invention permit carrying out pretzel production in continuous operation, i.e. with maximum automation of operating steps, from charging dough to removing finished, baked pretzels. Different dwelling periods in single zones of the baking line may be accommodated by suitably adapting the respective distances of passage in these zones.

It is also possible to shape the baking support in the form of baking trays which are sequentially passed from a stack onto a conveyor belt and stacked in a stacking device after their passage on the conveyor belt. From there, the stacked baking trays are preferably passed onto a trolley. accompanying the raw pretzels through the fermenting, conditioning, and cooling zones.

An advantageous embodiment of the device for producing a string of dough having precisely predetermined cross-sectional and longitudinal dimensions, such as e.g. usable for producing a string of dough having a thicker central portion for pretzel production, is also disclosed. Conventional devices of this kind, as for example those known in this field by the term of "longitudinal roller", have the disadvantage of the string of dough frequently achieving different lengths, and the thick portion of the string of dough not always coming to lie in the center of the string of dough. In manual production, such differing shapes may be tolerated more easily as the baker can adapt to individual shapes of the string of dough. In mechanical production of the pretzel, however, such differing shapes may have extremely disadvantageous effects on the production process. For example, the grippers cannot be ensured any more to actually receive the string of dough in the right location in predetermined positions. On the other hand, such differing shapes and/or positions may result in unsymmetrical strains on the piece of dough, which in given cases are excessively high in places and bring about an increased reject rate in either case. The device according to the invention for producing the string of dough having predetermined cross-sectional and longitudinal dimensions in any case ensures that the string of dough output by the device has not only a given shape, but also a predetermined position in relation to a reference surface. This makes further handling of the string of dough considerably easier. Devices for grasping the string of dough may be simplified essentially with respect to their structure and control, which is true for control during the knotting process, too. In the device according to the invention, the piece of dough is thus subjected to combined kneading and pressure. In other words, the piece of dough is provided with a transport cross-section having quite definite dimensions and being moved together with the piece of dough during production.

By means of one development of claim 21, a considerable shortening of the construction length of the dough molding means is achieved without affecting working precision. The shape of the surfaces which are moved towards each other on segmented conveyor belts has particular advantages from the viewpoint of technical hygiene. Removing single conveyor belt components, e.g. for cleaning purposes, may be ensured by simple means. This may be done with particular ease if the segments are given the shape of bars.

When facing surfaces of the segments of the segmented conveyor belt mesh in the manner of profiles, then the normal pressure on the piece of dough positioned between the segments may be increased, as hereby the pressure applied to the dough may distribute onto several adjacent segments.

One further advantage of the device according to the invention is that, due to suitable arrangement of guide rollers, the position of which is preferably adjustable, propagation of the normal pressure exerted on the piece of dough along the conveying and molding section may be influenced purposely. As used herein, the term "introduction gap" is to be understood in the widest possible sense to represent the wedge-shaped gap between the segmented conveyor belts along the conveying distance. In correspondence with this development, the gradual mutual approach of the segmented belts may be influenced for gradual adjustment of the pressure increase. In this way it is possible to make the segmented belts approach each other such that their edges contact each other only at the end of the conveying distance to imprint the string of dough through the high formal pressure with the length and thickness predetermined by the profile shape cut into the segments.

In the area where the portions of dough are introduced, it is advantageous to provide an enlarged angle of introduction, possibly by using additional reversing rolls. This measure may effectively prevent dough from entering the gaps between single segments.

A particular advantage of one development of the present invention is speedier and better controlled elongation of the piece of dough entered as a lump being achieved by simple means, thus further shortening the structural length of the dough rolling device.

The individual panels or segments of the segmented conveyor belt preferably form a continuous or closed surface in the molding section, i.e. in the range of straight or parallel course. Suitable means for guiding or supporting the panels or segments in the lateral area, or also in the central area, permit to control the resiliency, i.e. the bending deformation of the panels, whereby a more or less elevated molding pressure may be applied to the piece of dough in certain, desirable zones. This provides optimum control of the shape of the raw piece of dough with respect to its cross-section and length while passing through the molding section.

It turned out that particularly good reproduceability of dough molding may be achieved if, according to the relative velocity of opposing panel surfaces is adjusted such that the velocity of the belt moving in a direction opposite to the transport direction merely amounts to a fraction of the velocity of the other belt.

The dough molding means may be designed such that the assembly becomes even more compact.

It turned out that due to a variation in the vertical distance between the segmented conveyor belts forming the dough molding means, the length of the raw piece of dough may also be controlled well at the exit from the molding means. This control is implemented in a simple manner.

A molding and conveying section representing an alternative to the profiled, segmented conveyor belt is also described. The conveyor belt consisting of a textile material or a suitable synthetic material is supported on a profiled support area, preferably in the form of a shaped plate possibly consisting of synthetic material, metal, but even wood. The profile shape adapted to the string of dough to be produced is worked into this support surface.

If the conveyor belt passes over reversing rolls the profiles of which correspond to the profiled support surface, precision of shape of the string of dough to be produced is additionally improved.

The advantageous development of a sliding strip serves to minimize wear between the surfaces moved in relation to each other. The sliding strip preferably consists of synthetic material having good sliding properties.

An advantageous embodiment of the grippers grasping the ends of the string of dough is also disclosed. This development achieves the particular advantage of the grippers being capable of grasping the string of dough from all sides, without the risk of portions of dough being jammed. In this way, dough does not cling to the grippers when released anew, such that depositing the ends of the string of dough may be effected with high positional precision.

In order to further improve the alignment and positional precision of the string of dough output and supplied to the grippers by the dough molding means, the invention furnishes a fine alignment device whereby it may be ensured within a very short time, and thus in the working rhythm of the mechanically operating pretzel shaping and knotting device, that the ends of the string of dough always come to lie in the same optimum location for being grasped by the grippers, even at high advancing velocities. Transport from the dough molding means onto the receiving wheel is achieved without additional auxiliary energy, namely by utilizing gravity. Due to the design of the receiving wheel, the string of dough having a thick central portion—the diameter in this area being in the range of approx. 18 mm for pretzels—is treated gently, such that undesirable deviations from the intended pretzel shape may be precluded. In fine centering of the string on the receiving wheel, this central portion rolls off on a peripheral surface of the receiving wheel which preferably has a concave shape, namely in the center of the string of dough where the mechanical strength of the piece of dough is largest (end diameter approx. 4 mm). Undesirable unilateral elongations of the thinner ends of the pieces of dough are thereby precluded, inasmuch as the adjusting motions of the receiving wheel are very small and may be carried out within very short time spans.

In the following, several embodiments of the invention are explained in detail by making reference to schematic drawings, wherein:

FIG. 1 shows a perspective overall view of a device for the mechanical production of pretzels;

FIG. 2 in a somewhat enlarged scale shows a detail of the installation according to FIG. 1 when viewed along II of FIG. 1, in a first stage of the pretzel knotting process;

FIG. 3 shows the view corresponding to III in FIG. 2;

FIG. 4 shows a view of the device similar to the one in FIG. 2 during a later stage of the pretzel knotting process, when the grippers are about to initiate their 360° rotational motion;

FIG. 5 shows the view corresponding to V in FIG. 4;

FIG. 6 shows the view of the device corresponding to the representations in FIGS. 2 and 4 in a stage after the grippers have completed their 360° rotational motion;

FIG. 7 shows the view according to VII in FIG. 6;

FIG. 30 shows the view of the device corresponding to FIG. 29 with the receiving grooves folded up horizontally;

FIG. 31 shows the detail XXXI of FIG. 28; and

FIG. 32 shows a perspective view of the outer end of a receiving groove.

Figure 1:
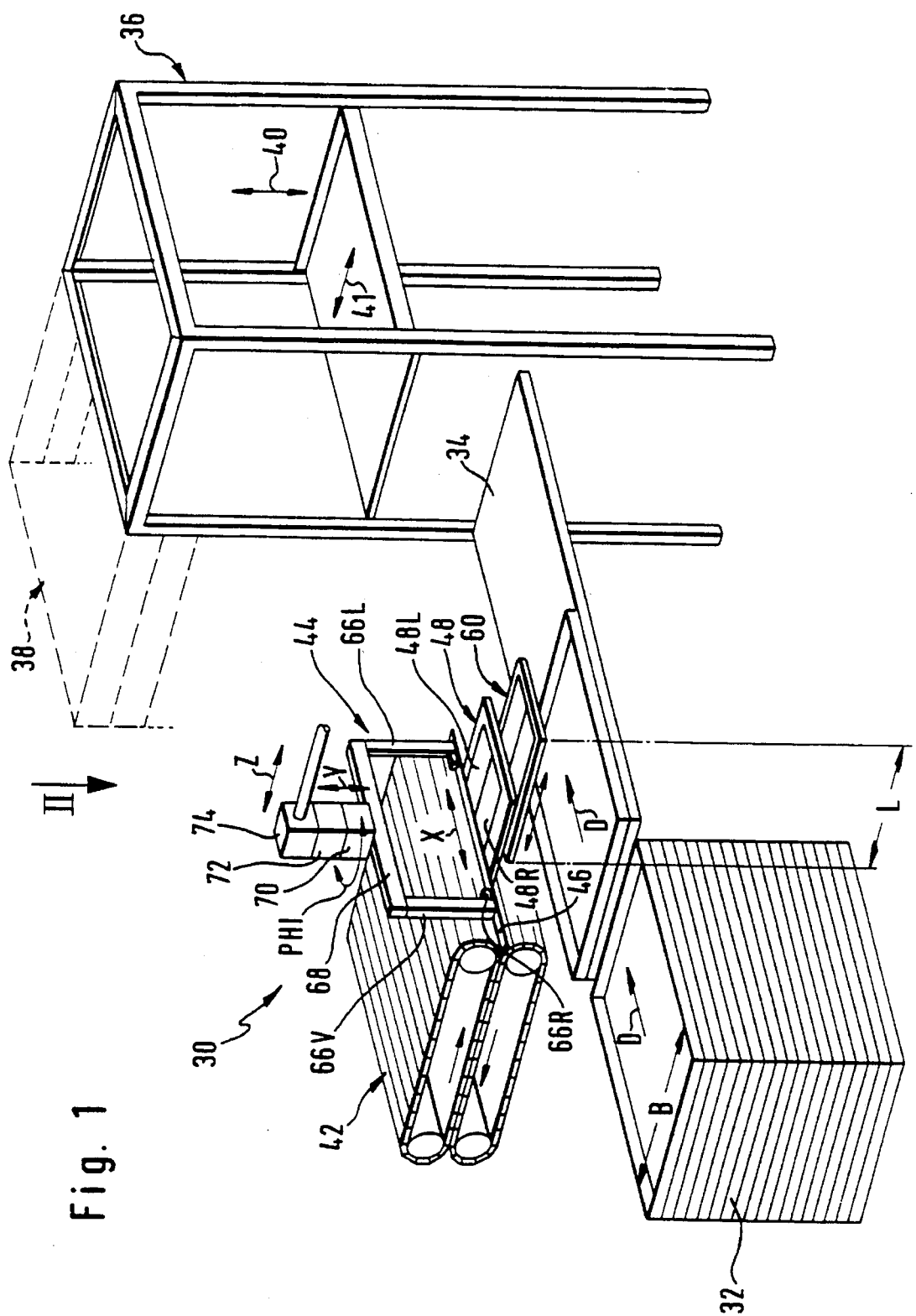

In FIG. 1, reference numeral 30 designates a pretzel forming station which forms part of a baking line comprising a stack of baking trays 32, a transport table 34, and a stacking device 36 for baking trays. The baking trays preferably are standardized trays, e.g. individualized and conveyed to the transport table 34 by means of hydraulic cylinders. The dashed lines indicate a trolley 38 adapted for receiving e.g. eighteen baking trays whereby the raw goods provided on the baking trays may be transported into a fermenting cabinet not represented here.

The double arrows 40, 41 indicate that the baking trays are translatable in the horizontal and vertical directions inside the stacking device 36 for baking trays, with automatic control preferably being applied for inserting and outputting the baking trays 32.

The pretzel forming station 30 is made up of two main components, namely a molding means 42 for molding a portion of dough into a string of dough having predetermined cross-sectional and longitudinal dimensions, and a pretzel knotting station 44 wherein the string of dough is grasped and knotted into the typical pretzel shape. What is particular about the string of dough intended for pretzel production is that, being essentially rotationally symmetrical, it considerably tapers from the central portion towards its ends, with differences in the precise geometry of the string of dough possibly existing between individual portions.

A reception or receiving depression 46 is provided between the molding means 42, a detailed description of which shall be given below, and the pretzel knotting station 44 wherefrom the string of dough is removed for further processing in the pretzel knotting station 44.

The structure of the pretzel forming station allows forming up to 700 pretzels per hour at low space requirement while treating the piece of dough as gently as possible and furthermore presenting a high degree of reproduceability and service friendliness of the installation at easy control.

As can be clearly seen in FIGS. 3, 5, and 7, a support 48—preferably horizontal—is for this reason provided laterally and preferably lowered by the dimension V, with this support on its upper side presenting a milled slot 50 in the form of the pretzel profile to be produced and also clearly recognizable in FIGS. 2 and 3. In the embodiment shown in the figures, the milled slot is complete, i.e. milled through over the entire pretzel profile. It should be emphasized here, however, that working the pretzel profile into the support is not absolutely necessary if the gripper control to be described below is utilized. It is also conceivable for the pretzel profile to be provided, i.e. worked into the support 48 in certain areas only, e.g. in the shaded area 50*.

The support 48 consists of two parts 48L and 48R associated with pivot hinges 52 and 54, respectively. The axes 56, 58 are parallel with each other and in the vicinity of the outer longitudinal edges of the support parts 48L and 48R thus provided as pivoting trapdoors. By means of a drive and control mechanism not represented here, the support trapdoors 48L and 48R may be moved in a timed manner between the position represented in the figures, wherein they form a level support, and a position rotationally pivoted thereto by 90° wherein the support trapdoors 48L and 48R are in parallel and directed essentially in a vertical direction. Driving the support trapdoors 48L and 48R is effected inversely and in synchronicity, such that the pretzel completely knotted on the support 48 is shifted downwards in parallel translation throughout the pivoting motion of the support trapdoors 48L and 48R and is allowed to fall onto an intermediate storage surface 60 arranged below the support 48 while having an essentially horizontal orientation, whereby undesirable deformations of the raw pretzel are precluded.

The following is to give a more detailed description of the manner in which a string of dough 62 output by the molding means 42 is knotted into a raw pretzel 64 on the support 48.

In order to transport the string of dough 62 and knot it into the pretzel shape, a pair of grippers 66L and 66R extending in an essentially vertical orientation with a mounting portion, and mounted such as to be slidingly translatable on a horizontal transverse member 68 is provided. The grippers 66R and 66L are associated with a drive mechanism also not represented here, such that the grippers are given a first linear degree of freedom X. The transverse member 68 is mounted on a revolving head 70 associated with a rotational drive not represented here and having a degree of freedom PHI. The revolving head 70 is mounted on a vertical slide 72 having a second degree of free movement Y which is at right angles with the first degree of free movement. The vertical slide 72 is carried by a linear unit, or retaining head 74 having a third linear degree of moving freedom Z. Drive aggregates are provided for each of axes X, Y, Z and for the rotational degree of moving freedom PHI, with these drives working pneumatically, hydraulically or electrically. In this context, pneumatic, hydraulic, linear and/or rotating cylinders may be used. Particularly advantageous for axial control, however, is the use of a stepping motor, as thereby synchronisation of the single axial movements may be effected most easily.

The home position of a pretzel knotting cycle is represented in FIGS. 2 and 3. Grippers 66L and 66R herein approach the ends 62E of the string of dough 62, with these ends—as will be described in more detail later on—permanently having the same positional relation to the coordinate system of the knotting station 44 due to the particular design of the molding means 42.

As soon as the ends 62E have been grasped, the grippers 66L and 66R are shifted into the positons according to FIGS. 4 and 5, preferably along the shortest path (motion curve K1). This means that synchronous drive movements are initiated for axes X, Y, Z. Due to separate drives being provided for each axis, the exact course in time of the drive movements along a respective axis may be optimized with the purpose of exerting possibly small strains on the piece of dough at a given timing. The individual sections of motion along the three axes are designated by X1, Y1, and Z1 in FIGS. 4 and 5. FIGS. 4 and 5 reveal that during this sequence of motions of grippers 66L and 66R, the string of dough 62 is pulled off the support 46 for the string of dough and onto the support 48, wherein it is ensured by the defined and controlled gripper movements that the string of dough 62 in each cycle precisely takes the spatial position according to FIGS. 4 and 5. The milled slot 50 which is possibly provided in the support 48 additionally supports this objective. As the individual axes of movement may be driven independently of each other, the temporal sequence of individual axial movements may be selected—according to the properties of the dough and/or the support—such that it is in any case ensured that the string of dough is first of all pulled off support 46 onto support 48 and takes a predetermined position there. On the other hand, individual drive of axes of movement ensures the possibility of the grippers travelling in the shortest possible time from their home positions to the points according to FIGS. 4 and 5.

FIGS. 4 and 5 indicate that the grippers 66L and 66R did not change their position in relation to the vertical holder 66V. The ends of the string of dough are consequently still oriented horizontally. It should, however, be emphasized at this point that it is also possible to drive the grippers simultaneously and inversely while moving from their home positions into the positions according to FIGS. 4 and 5, such that the ends of the string of dough are pointing vertically upwards in the position according to FIGS. 4 and 5. Thereby the string of dough is treated even more gently.

FIGS. 4 and 5 indicate that the grippers have meanwhile moved into positions relatively close to the so-called "heart" of the pretzel to be formed. These respective locations are shown under 76 in the milled slot 50. Accordingly, the rotational center 78 of the revolving head 70 is also positioned in the vicinity of the "pretzel heart". In this position of the grippers, i.e. at unchanged coordinates X, Y, Z, a 360° rotational movement of the revolving head 70 is carried out in a first rotating direction. The transverse member advantageously lies above the longitudinal roller 42, and the holding arms 66V are positioned so closely near each other that they will not collide when the transverse member pivots together with the molding means 42. This additionally simplifies control. The thinner ends of the string of dough— as indicated in FIG. 6 and 7—are intertwined during rotation of the transverse member (±PHI). At the end of the rotating movement, the components of the knotting station 44 and the string of dough 62 take the positions shown in FIG. 6 and 7. In the depicted embodiment, the coordinates X, Y, Z of the grippers remain unchanged during the twisting motion. For a gentler treatment of the dough, in particular pretzel shapes, it is, however, also possible to provide simultaneous, predetermined motion control in at least one of axes X, Y, or Z, for example in order to preclude local overstretching of the string of dough, or in order to carry out slight corrections concerning the shape of the string of dough.

The representation according to FIG. 6 indicates that in this position, the string of dough has already largely approached the desired final shape. Particularly with the use of high-resolution stepping motors, it may be ensured with a high degree of reproduceability that the string of dough will take a precisely defined spatial orientation in relation to the X, Y, Z frame of reference.

Figure 8:
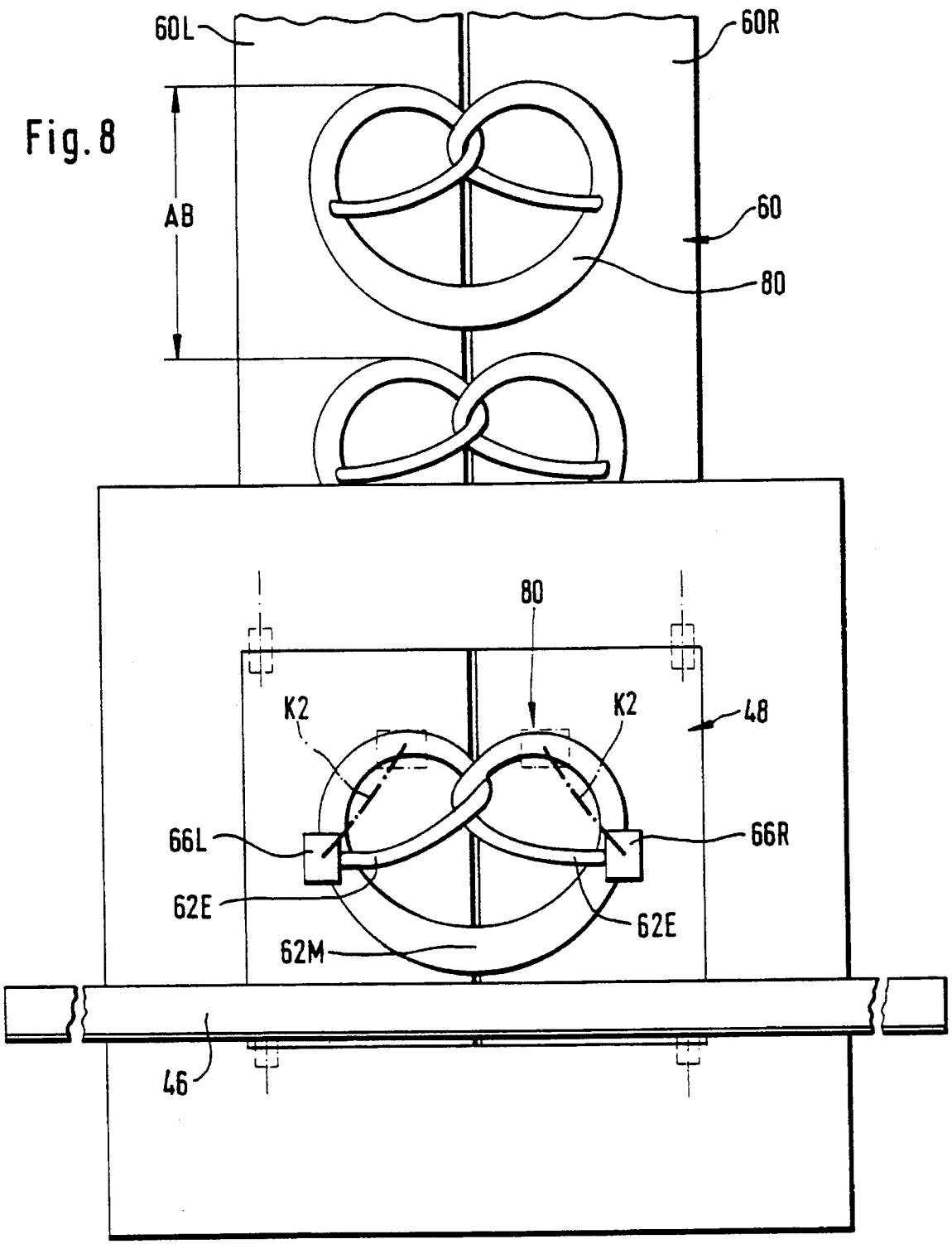
FIG. 8 shows the top view of the pretzel knotting or forming station when the ends of the string are pressed onto the central portion of the pretzel.

In the next section of their movement, the grippers are again moved along the three X, Y, Z coordinates along the movement curve K2 into the position according to FIG. 8. The grippers 66 are correspondingly shifted downwards (Y axis), apart in a lateral direction (X axis) and slightly towards the support (46) for the string of dough, until the ends 62E of the string of dough are positioned precisely above the desired pressure contact locations on the central portion 62M of the string of dough. The ends of the string of dough are preferably released after the gripper drives are turned off, such that the ends of the string of dough are lowered onto the central portion of the string of dough 62. The grippers 66L and 66R are then translated upwards a short distance along the Y axis, closed, and subsequently moved down (Y axis) again for a given distance, such that the ends of the string of dough are pressed onto the central portion of the string of dough. The process of forming the pretzel is thus concluded. Finished raw pretzels are shown under 80 in the figures.

While knotting of the raw pretzel is completed on the support 48, the intermediate storage area 60 underneath is positioned in such a way that a free space for receiving the raw pretzel 80 is provided below the support 48. To this end, the intermediate storage area 60 is associated with a movement drive parallel with the Z axis. In the embodiment shown in the figures, the intermediate storage area 60 is constituted by two panels 60R and 60L which are pivotably mounted similar to the panels 48R and 48L, and the length of which essentially corresponds to the width B of a baking tray 32 and which are movable back and forth along the double arrow shown in FIG. 1. The support wings 60R and 60L have lateral pivoting axes in parallel with the pivoting axes of support panels 48R and 48L. The support wings 60R and 60L are also pivotable in a timed manner between the position shown in the figures and an opened position, with pivoting movement in this case, too, being effected inversely and synchronously.

When the intermediate storage area 60 is positioned properly, the pivoting movement of support panels 48R and 48L may be triggered. The raw pretzel 80 is conveyed downwards in free fall in parallel translation and arrives on the intermediate storage area 60 which is then moved on by one timing, i.e. one pretzel distance AB. When the line of pretzels formed on the intermediate storage area 60 has been completed, the support wings 60L and 60R are pivoted away downwards and the entire line of pretzels drops in a controlled manner and in parallel translation onto the baking tray 32 underneath, which in the meantime was positioned by a suitably timed drive such that no raw pretzels 80 are present underneath the intermediate storage area 60. Once the baking tray 32 has been filled by this simultaneous deposition of raw pretzels on the intermediate storage area 60, the next baking tray 32 taken from the stack is again positioned underneath the intermediate storage area 60, whereby it is ready for receiving the next line of pretzels.

During the transport of the raw pretzels described above, the grippers 66L and 66R return into their home positions according to FIGS. 2 and 3 and grasp the next string of dough, which—also in timing—was meanwhile set up by the molding means 42. The above described cycle then unwinds for the next piece of dough, however with an inverse rotating movement of the revolving head.

Due to the arrangement of the single components and the short moving distances according to the invention, about five seconds are enough for one pretzel knotting timing, resulting in a clearly increased throughput rate compared with conventional devices. The system may also operate by using standardized baking trays, such that the production process may be integrated into conventionally equipped baking studios without problems.

This high timing frequency may be achieved not least due to the fact that expensive control processes for precise gripper positioning in relation to the string of dough may be done away with. This is ensured by the use of specially adapted molding means 42 which shall be described in detail by referring to FIGS. 9 to 13. In this context, it is emphasized that this molding means may also advantageously be used for other processes of molding pieces of dough in baking where it is important to provide rotationally symmetrical pieces of dough with precisely defined cross-sectional and longitudinal dimensions at a predetermined location of a baking line.

What the shown embodiments have in common is that a portion of dough (not represented) is inserted into a conveying gap 82 between two surfaces 84, 86 which are moved in relation to each other, with the cross-section of the conveying gap conforming with the longitudinal section of the piece of dough, or string of dough, to be produced in at least an area of an outlet 88 of the molding means 42. In this way, the portion of dough describes a rotating and kneading movement, with the longitudinal section of the piece of dough increasingly approaching or gradually filling the longitudinal section of the conveying gap 82 during its passage. Transformation of the portion of dough is completed when the cross-section of the conveying gap 82 is filled entirely. Thus the piece of dough is output from the molding means 42 having not only a predetermined cross-section and longitudinal section, but at the same time a precise orientation.

Figure 9:
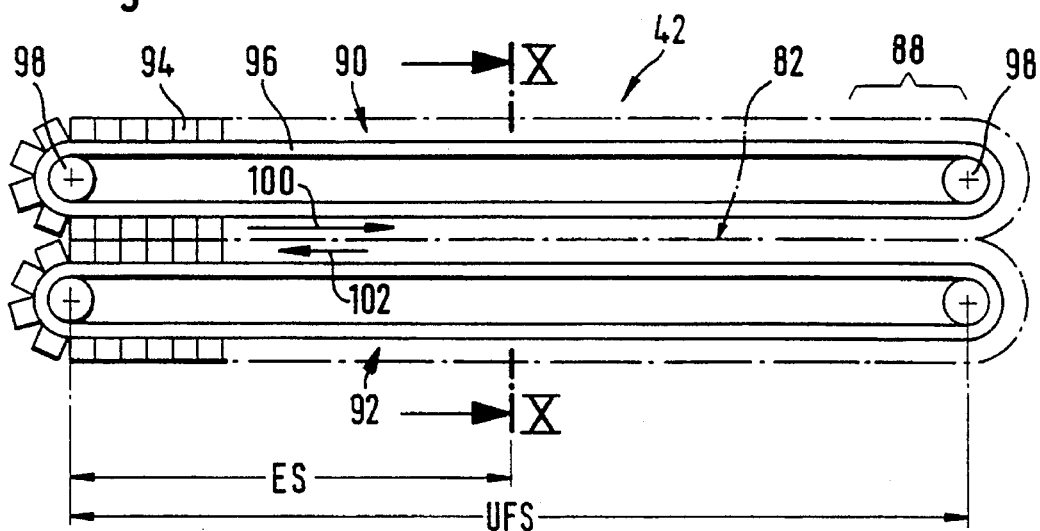
FIG. 9 shows a side view of a longitudinal roller used in the device according to FIGS. 1 to 8.
Figure 10:
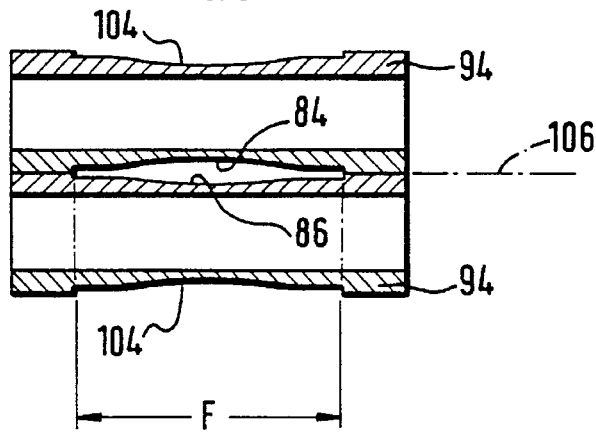
FIG. 10 shows the section according to X—X in FIG. 9.

In the embodiment shown in FIGS. 9 and 10, the surfaces moved in relation to each other are constituted by segmented conveyor belts 90, 92 consisting of a plurality of identical profiled segments 94 which—preferably exchangeably —are mounted on a roller chain 96 by means of mounting links not shown here. The roller chains 96 pass over end-sided deflection rollers 98. The arrows 100, 102 indicate advancing directions of the segmented conveyor belts 90, 92. It is obvious that in the embodiment shown in FIGS. 9 and 10, the segmented conveyor belts are running in opposite directions, with the different advancing velocities indicated by the sizes of the arrows. The direction of transport conforms with the direction of the segmented conveyor belt 90 having the greater velocity 100. The embodiment shown in FIGS. 9 and 10 is characterized by a particularly short construction length.

The profiled segments 94 are essentially bar-shaped. They are altogether shaped identically in the embodiment according to FIGS. 9 and 10, i.e. an identical recess 104 is worked into each profile segment 94, such that the molding and conveying gap having a width F is shaped to be symmetrical with the plane of contact 106. The width F conforms with the desired length of the piece of dough to be molded.

It should be emphasized here already that identical design of the profiled segments 94 is not an indispensable requirement. It is rather also possible to have only the profiled segments of a segmented conveyor belt 90 or 92 shaped identically, with their arrangement in the molding and conveying gap 82, however, then having to be made such that mutually facing segment surfaces complement each other to form the desired longitudinal cross-section of the piece of dough to be produced.

Figure 11:
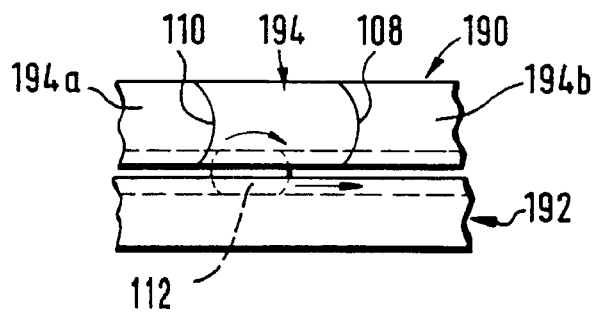
FIG. 11 shows a partial view in a somewhat larger scale of a further embodiment of the conveying segments used in the longitudinal roller.

In the representation according to FIGS. 9 and 10, the profiled segments 94 are represented schematically with their parallel surfaces contacting each other in the area of the molding and conveying section UFS. One variation is shown in FIG. 11. The segments are shown under 194 and their front and rear surfaces 108 and 110, respectively, mesh in the manner of a profile. In the embodiment according to FIG. 11, these profile surfaces are formed by convexely and concavely curved surfaces, respectively. This development has the advantageous effect of the molding forces taking effect on a certain location of the portion of dough 112 being capable of being passed on to adjacent segments 194a and 194b. Hereby the kneading work indicated by the arrow in FIG. 11 may even be intensified during transport through the molding means, which is favorable for the quality of the piece of dough. Fluctuations of the dough mass are compensated according to the invention in that the central portions of the bar-shaped segments can bend to a certain degree. The length F of the string of dough is not modified thereby.

The embodiment according to FIG. 11 moreover differs from the embodiment according to FIG. 9 in that merely a driven segmented conveyor belt 190 is provided while the opposing surface 192 is static.

In order to gradually increase pressure on the portion of dough 112 while it passes through the molding and conveying section UFS, it is of advantage to guide the segmented conveyor belts such that the segments completely contact each other only after a prolonged introductory section ES. This introductory section ES preferably is variable.

Figure 12:
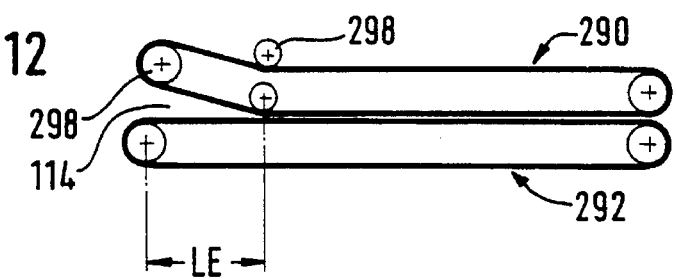
FIG. 12 shows a principle sketch of another embodiment of the longitudinal roller.

The embodiment according to FIG. 12 furthermore differs from the above embodiments in that additional deflection rollers 298 are associated with one segmented conveyor belt, namely the top segmented conveyor belt 290, thereby creating an enlarged introductory gap 114. This enlarged introductory gap safeguards against dough penetrating between single segments during charging of the portions of dough. The profiled segments 94, 194 preferably consist of steel, aluminum, or a synthetic material, inasmuch as these materials best fulfill the requirements to technical hygiene in a bakery.

Figure 13A:
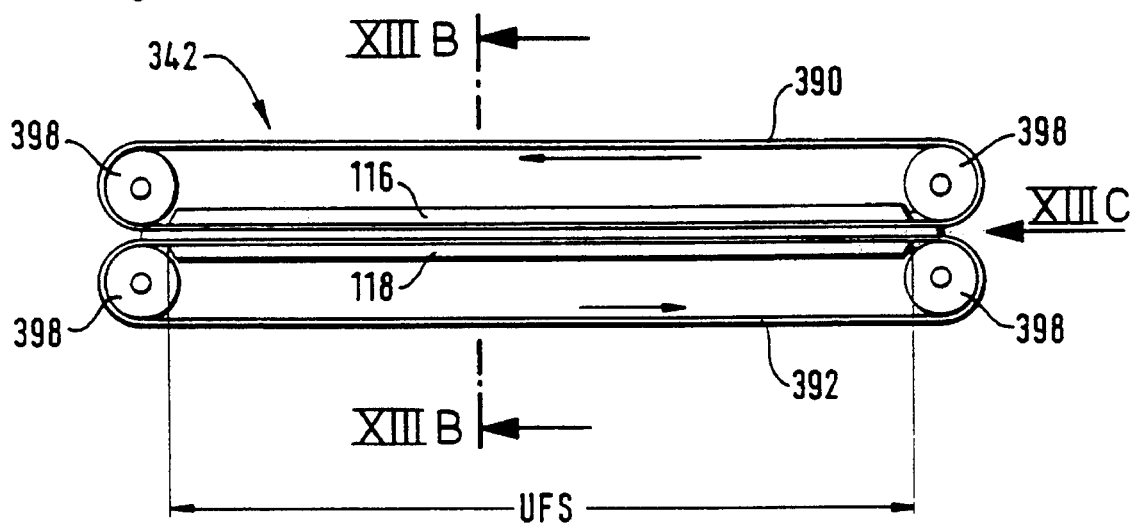
FIG. 13A shows a side view of another variation of the longitudinal roller.
Figure 13B:
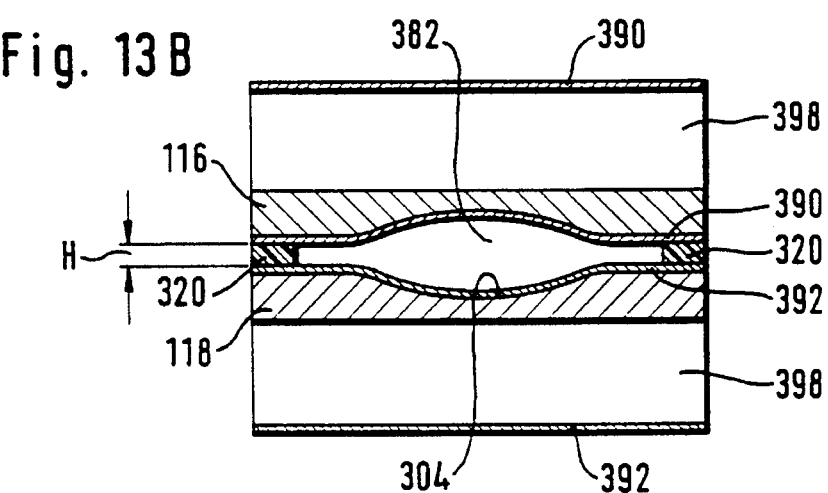
FIG. 13B shows the section along XIIIB—XIIIB in FIG. 13A in a somewhat larger scale.
Figure 13C:
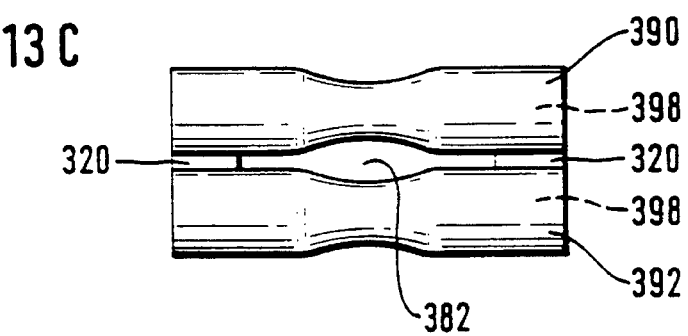
FIG. 13C shows the view corresponding to XIIIC in FIG. 13A.

One further embodiment of the molding means in the form of a so-called longitudinal roller is shown in FIGS. 13A to 13C.

The embodiment according to FIG. 13 differs from the embodiments described above in that the transport and kneading surfaces which are moved in relation to each other are constituted by conveyor belts 390, 392 guided via deflection rollers 398. In the area of the molding and conveying section UFS, the conveyor belts 390, 392 are supported on a molding panel 116 and 118, respectively, with this molding panel being profiled to conform with the cross-sectional and longitudinal sectional profile of the piece of dough to be produced. The conveyor belts preferably consist of textile material or of a suitable synthetic material, such that they may establish full-surface contact with the molding panels 116, 118. To this end, particularly in the area of exit from the molding means 342, the deflection rollers 398 are also correspondingly profiled, which is clearly indicated in FIG. 13C.

Synthetic material, metal, but even wood may be used as a material for the molding panels 116, 118.

The particularity of the embodiment according to FIG. 13 consists in that steps were taken to minimize sliding frictional wear between the surfaces moved in relation to each other, i.e. between the inversely driven belts 390, 392. For this reason, lateral bar-shaped strips 320 of synthetic material are provided in the area of the molding and conveying section UFS, with the cross-sectional dimensions of these strips being selected such that the cross-section enclosed by the strips 320 of synthetic material and the conveyor belts closely contacting the profile recesses 304 conforms with the longitudinal section of the piece of dough to be produced. In other words, the height H of strips 320 of synthetic material essentially conforms with the diameter of the piece of dough at their lateral ends. In this way, the sliding strip 320 of synthetic material determines the final length of the string of dough. The sliding strip 320 of synthetic material may concurrently be used to reduce the structural height of molding panels 116, 118.

The above described sliding strip 320 of synthetic material may, of course, also find use in other embodiments, e.g. according to FIGS. 9 to 12. Here, too, the advantage is achieved that segment wear due to sliding friction is minimized and the volume of the recesses in the segments may be kept smaller.

Figure 14:
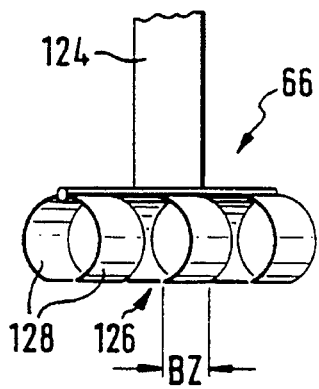
FIG. 14 shows a schematic, perspective view of a gripper end or head.
Figure 15:
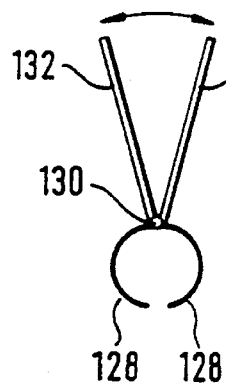
FIG. 15 shows a schematic view of the gripper in the closed state.
Figure 16:
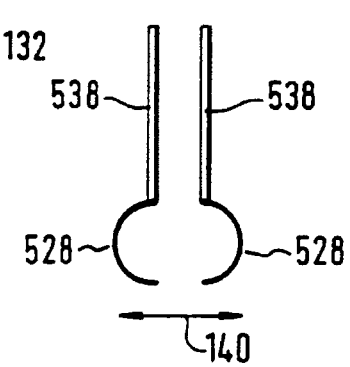
FIG. 16 shows a schematic side view of another embodiment of the gripper in the opened state.

In FIGS. 14 to 16, embodiments of gripper heads 66 are represented; 124 designates a holding section carrying a tong body arrangement 126. The latter consists of at least one tong 128 having tong legs curved into the shape of an arc. In the embodiment according to FIG. 14, three such tongs are parallel to one another.

The tong legs 128 in the embodiment according to FIG. 15 have a pivot 130 and they each continue on the other side beyond the pivot in an actuating leg 132. When these actuating legs 132—as indicated by the double arrow according to FIG. 15—are moved towards each other, the tong 128 opens and the gripper may from above reach over the end 62E indicated by a dash-dotted line in FIG. 17.

Figure 17:
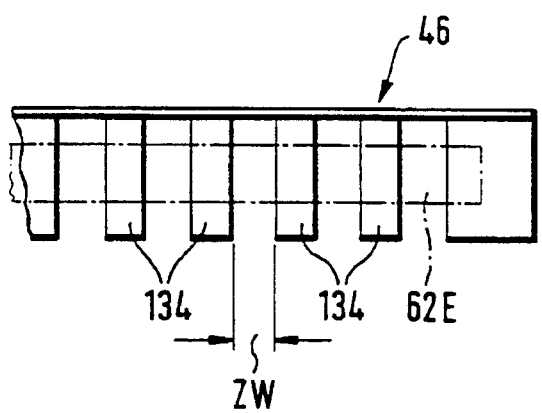
FIG. 17 shows a top plan view of a receiving depression in the area of a marginal portion according to a first embodiment.

In order for the ends 62E of the string of dough to be enclosed by the tong legs 128 on all sides, the support for the string of dough is interrupted in certain areas—as shown in FIG. 17—at least in the area of the lateral edges, such that the tong legs 128 may enter between material webs 134 of the support area, or support depression, for the string of dough. In other words, the width ZW of the gap between the material webs 134 is slightly greater than the width BZ of the tong legs 128.

Figure 19:
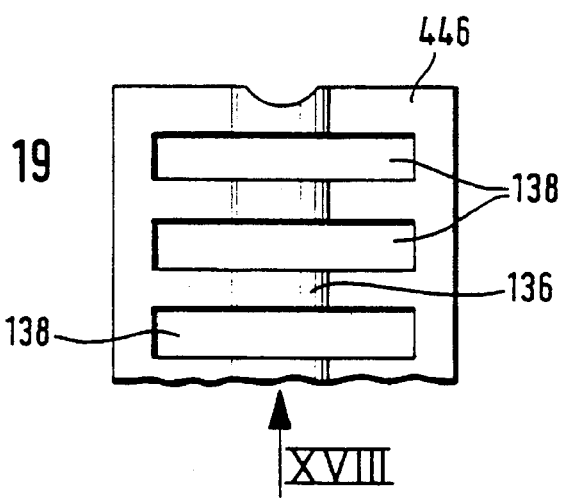
FIG. 19 shows the view corresponding to XIX in FIG. 18.

In FIG. 19, a variation of a support for a string of dough, or an alternative design for the lateral areas of such a support is shown. The support designated by the reference numeral 446, for example, is formed by a sheet metal part having a deep trough 136 along its central longitudinal axis. At least in the area of the lateral ends, rectangular punched openings 138 are applied wherethrough the tongs 128 of the gripper 66 may pass, such that the string of dough lying in the trough 136 may be completely surrounded by the tong legs 128.

Figure 18:
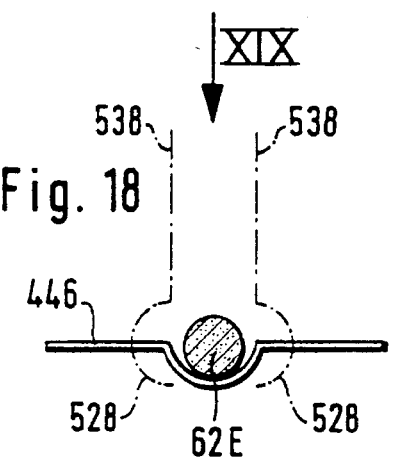
FIG. 18 shows a side view of another embodiment of a receiving depression for a string of dough according to a second embodiment.

Referring to FIGS. 16 and 18, another variation of the grippers is represented. In this case, the tong legs designated with 528 are positioned on holding legs 538 which are in parallel relation with each other, and which other than in the embodiment according to FIG. 15 are moved apart in parallel orientation with each other for opening the tong legs 528. This is indicated by the double arrow 140. In FIG. 18, the position of the gripper head in the opened state of the tongs immediately after entering into the support 446 for the string of dough is represented by dashed lines.

By means of the above described structure of the pretzel forming installation, maximum automation may be achieved while handling the piece of dough as gently as possible. For the installation according to FIG. 1 merely one person is required, with however in this case lye treatment and salting and, in a given case, application of another cut in the central portion of the raw pretzel still being carried out by hand. In the case of the embodiment according to FIG. 1, transport from the fermenting zone to the baking oven is furthermore still to be carried out manually.

Figure 20:
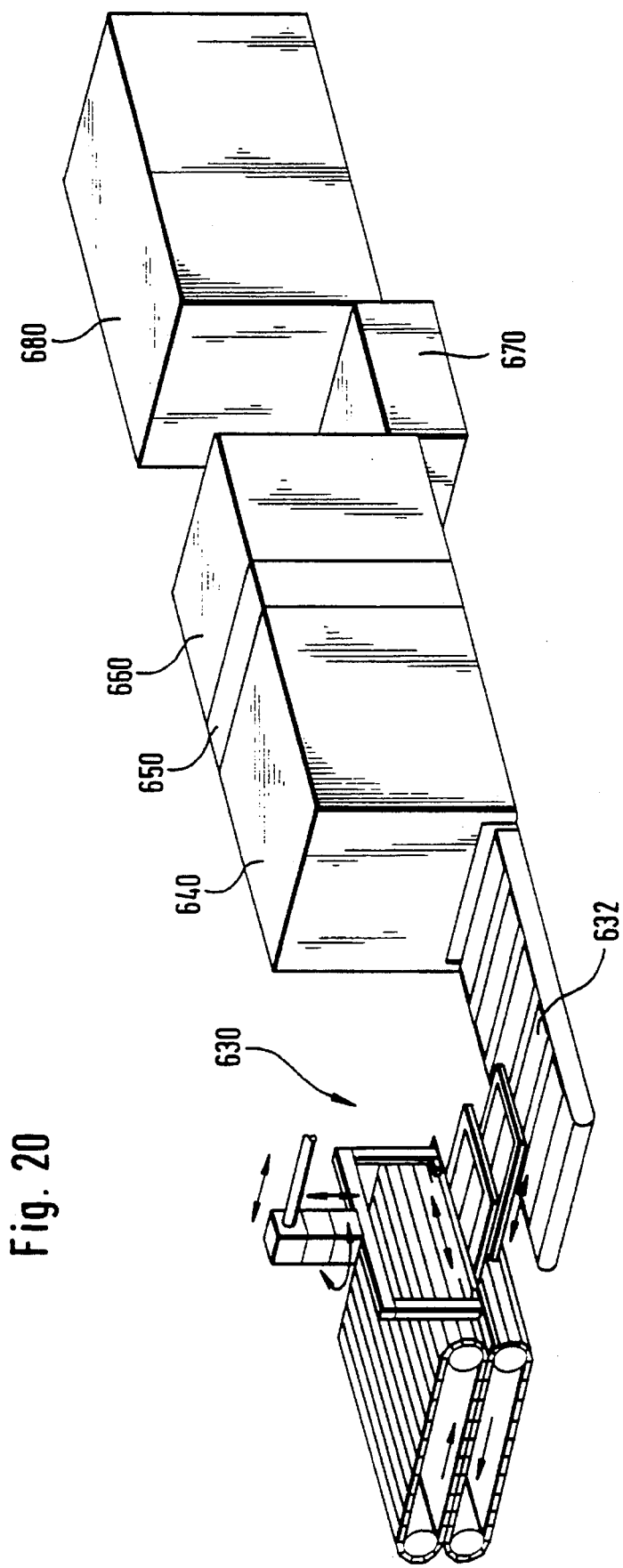
FIG. 20 shows a baking line for fully automatic pretzel production in a view similar to the one of FIG. 1.

The embodiment according to FIG. 20 differs from the above described installation in that pretzel production takes place completely automatically.

For this purpose, a conveyor belt 632 is provided as the transport means instead of the baking trays 32, with this conveyor belt on its timed passage not only passing through the pretzel forming station 630, but successively also a fermenting cabinet 640, a climate zone 650, a cooling device 660, a lye treatment station 670, and the baking oven 680 proper. Inside the climate zone 650, the dwelling period is merely approximately five minutes. In this zone, supply of air prevents condensate from forming on the pretzels.

Subsequently the conveyor belt with raw pretzels placed thereon passes for about 15 minutes through the cooling device wherein a temperature of approx. 2° C. prevails.

After passing through the cooling device 660, the raw pretzels are taken through the lye. Afterwards the raw pretzels are salted and, in a given case, provided with a cut in the area of the central portion. The pretzels are finally baked in the baking oven 680 at 240° C. over a dwelling period of 15 minutes. At the exit from the oven 680, the baked pretzels drop into transport containers (not shown).

Different dwelling periods in respective zones of the pretzel baking installation are achieved by suitable choice of the distances to be covered inside these zones.

The above described baking line results in the particular advantage of only one operator being required for supervising it. With this installation, the work expense in pretzel production is reduced to about 20% of the expense in manual production.

Variations of the shown and described embodiments of the pretzel forming installation are, of course, possible without departing from the spirit of the invention. For example, deposition of the freshly knotted raw pretzels on the intermediate storage surface may be solved by the pretzel knotting support always successively being advanced by one pretzel distance together with the retaining head 74, i.e. the linear unit along the Z axis. It is also possible to use, instead of the support wings 60R and 60L, pivotally mounted conveyor belts which are advanced in timing by one pretzel distance and tilted downwards after filling in order to deposit the entire line of raw pretzels on the baking tray, or on the conveyor belt.

In order to simplify charging the portion of dough on the longitudinal roller, an alternative embodiment may consist in somewhat shortening the upper transport belt or segmented conveyor belt. It is also possible to use only a single such moved belt which cooperates either with a profiled antagonist surface or a smooth one, instead of two transport belts of textile or synthetic material being moved in relation to each other.

Figure 21:
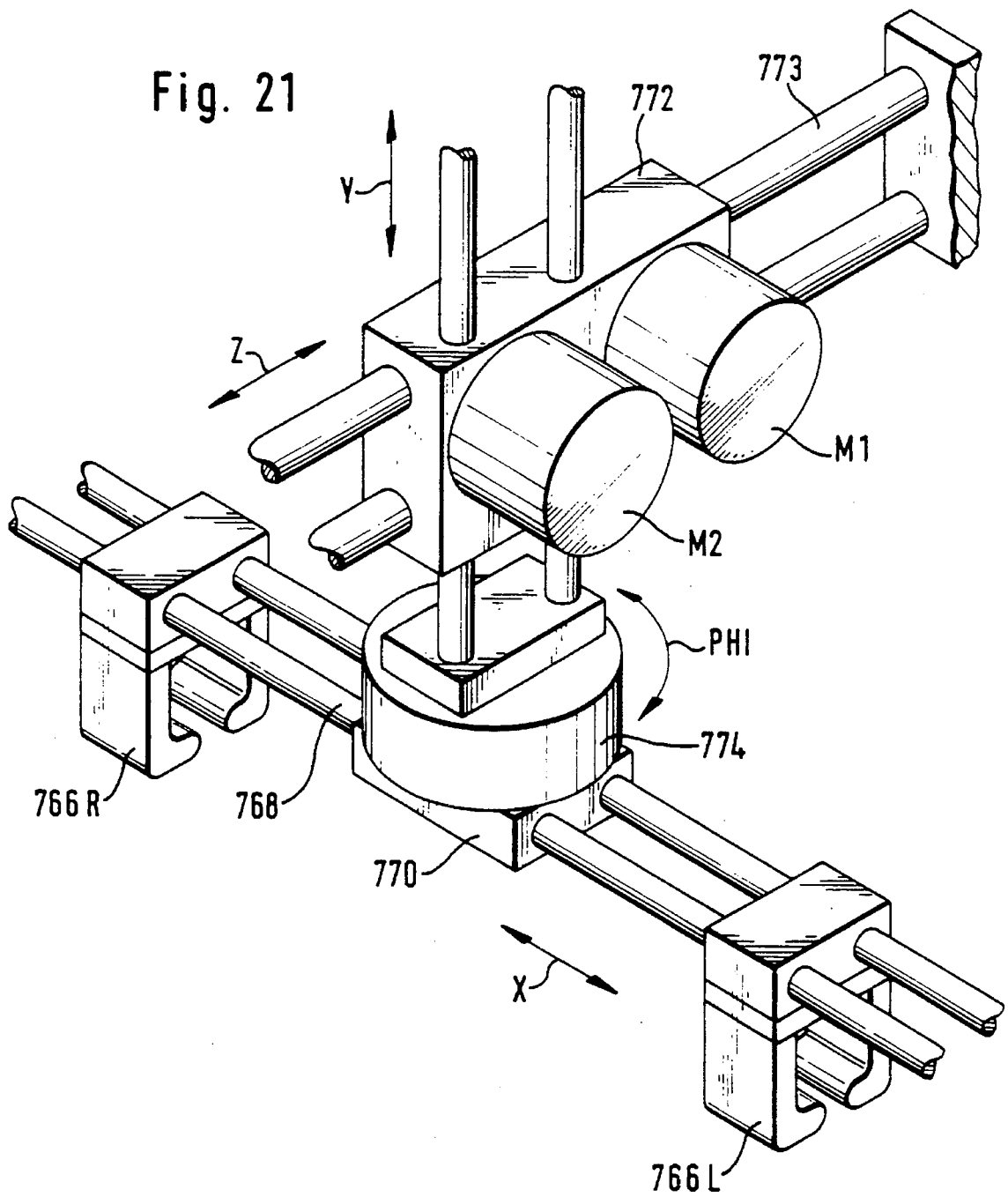
FIG. 21 shows a schematic, perspective view of the gripper mounting in order to illustrate kinematics.
Figure 22:
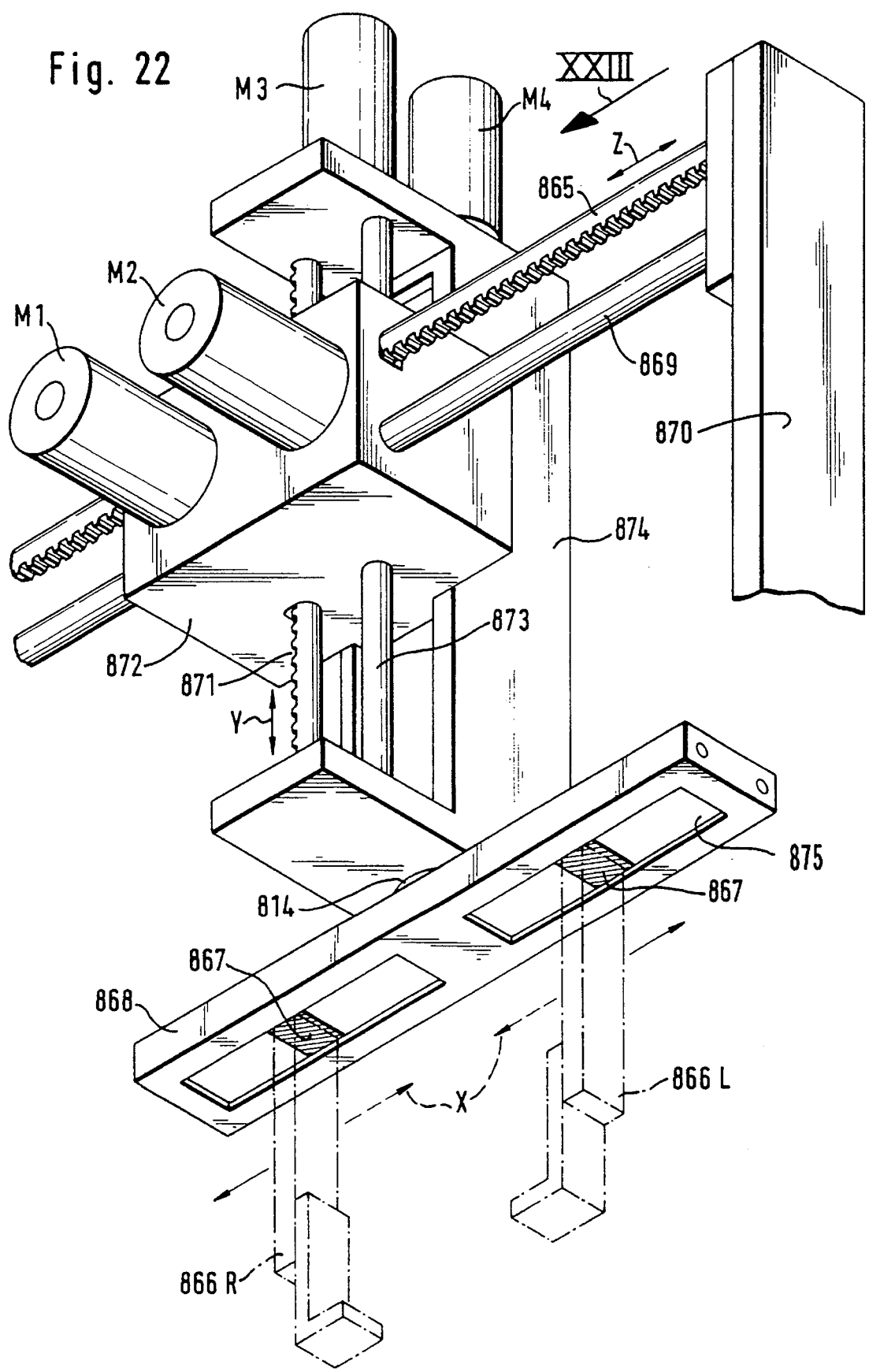
FIG. 22 shows a schematic, perspective part view of another embodiment of the gripper mounting.
Figure 23:
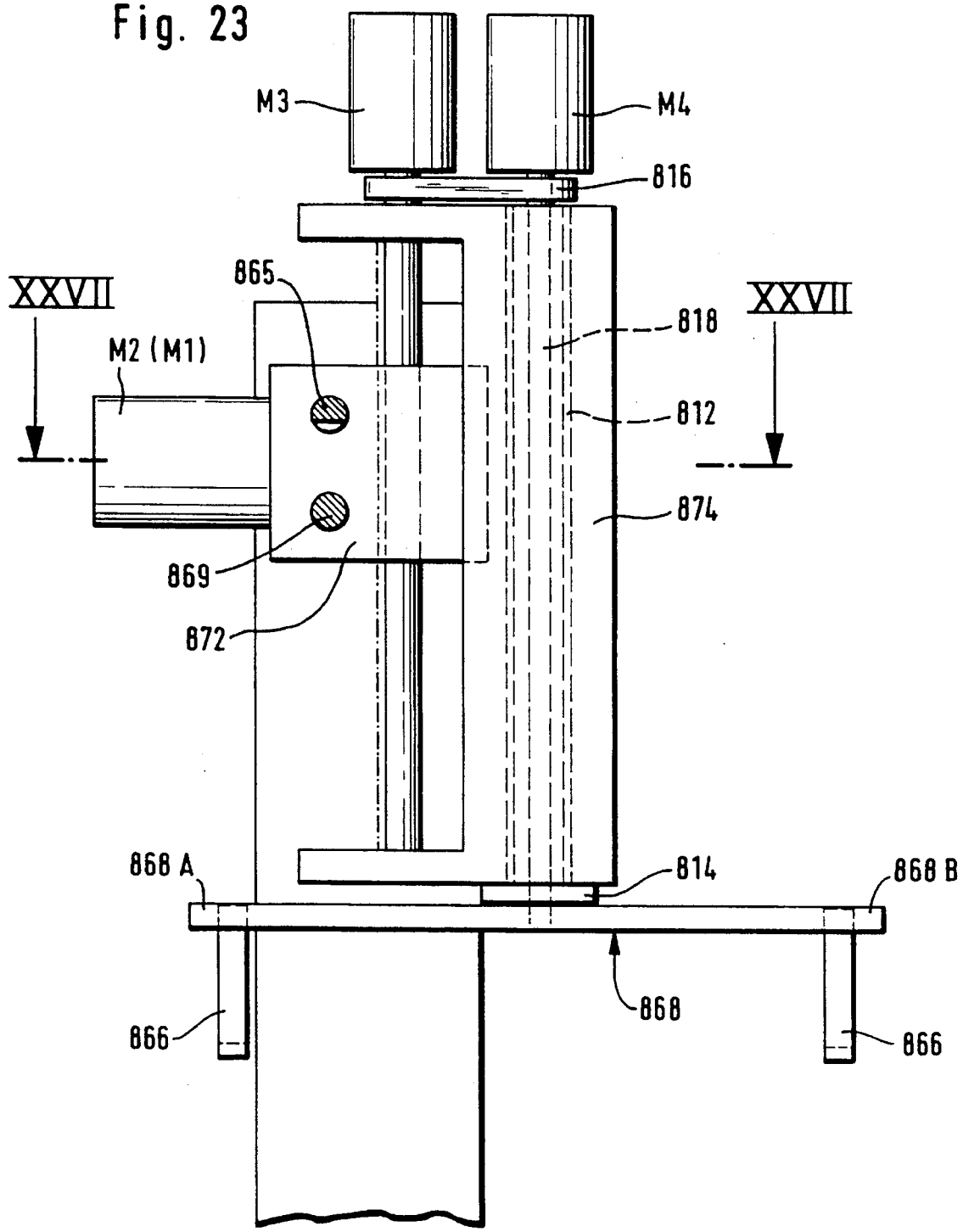
FIG. 23 shows a schematic side view of the device according to FIG. 22 when viewed in a direction along XXIII in FIG. 22.

In FIG. 21, another variation of gripper suspension is shown to differ from the embodiment according to FIG. 1 in that modified kinematics are used for movement in the directions of the Y and Z axes. The transverse member shown under 768 carries the gripping arms 766R and 766L and in turn is held by a revolving head 770 mounted on a vertical slide 774. The vertical slide 774 is held on a carrier head 772 for the purpose of height adjustment (Y axis), with the carrier head in turn being translatable along the horizontal Z axis along a transversal guide 773. PHI designates the pivoting angle over which the transverse member 768 may be moved in order to carry out the pretzel knotting motion. M1 and M2 indicate drive motors whereby the translatory movements in the Z and Y directions may be initiated.

In this embodiment, as well, grippers 766R and 766L are movable inversely in the direction of the X axis by means of a motor e.g. incorporated in element 770. The lift required herefore is e.g. 200 mm. Vertical lift is around approx. 100 mm, and the horizontal lift (Z axis) around 300 mm.

A somewhat modified embodiment of the transverse member mounting is explained in more detail in the following referring to FIGS. 22 to 27. The transverse member shown under 868 comprises guides 75 for carrier panels 867, whereon grippers 866R and 866L, indicated in dash-dotted lines, are fastenend. These grippers—as indicated by arrow X—are drivable inversely as was already explained in the above in context with the pretzel knotting process.

The transverse member 868 is rotatably mounted on vertical slide 874, which in the following is to be described in more detail. The vertical slide 874 is held on a carrier head 872 via a guide 873, with the guide being in Y direction. In parallel with guide 873, a rack 871 is provided and extends through a passage opening in carrier head 872.

The carrier head 872, in turn, is kept movably on a frame (not represented), of which merely a column 870 is indicated. In parallel with guide 869, a rack 865 is provided and extends from the column 870 to another, parallel column.

Figure 27:
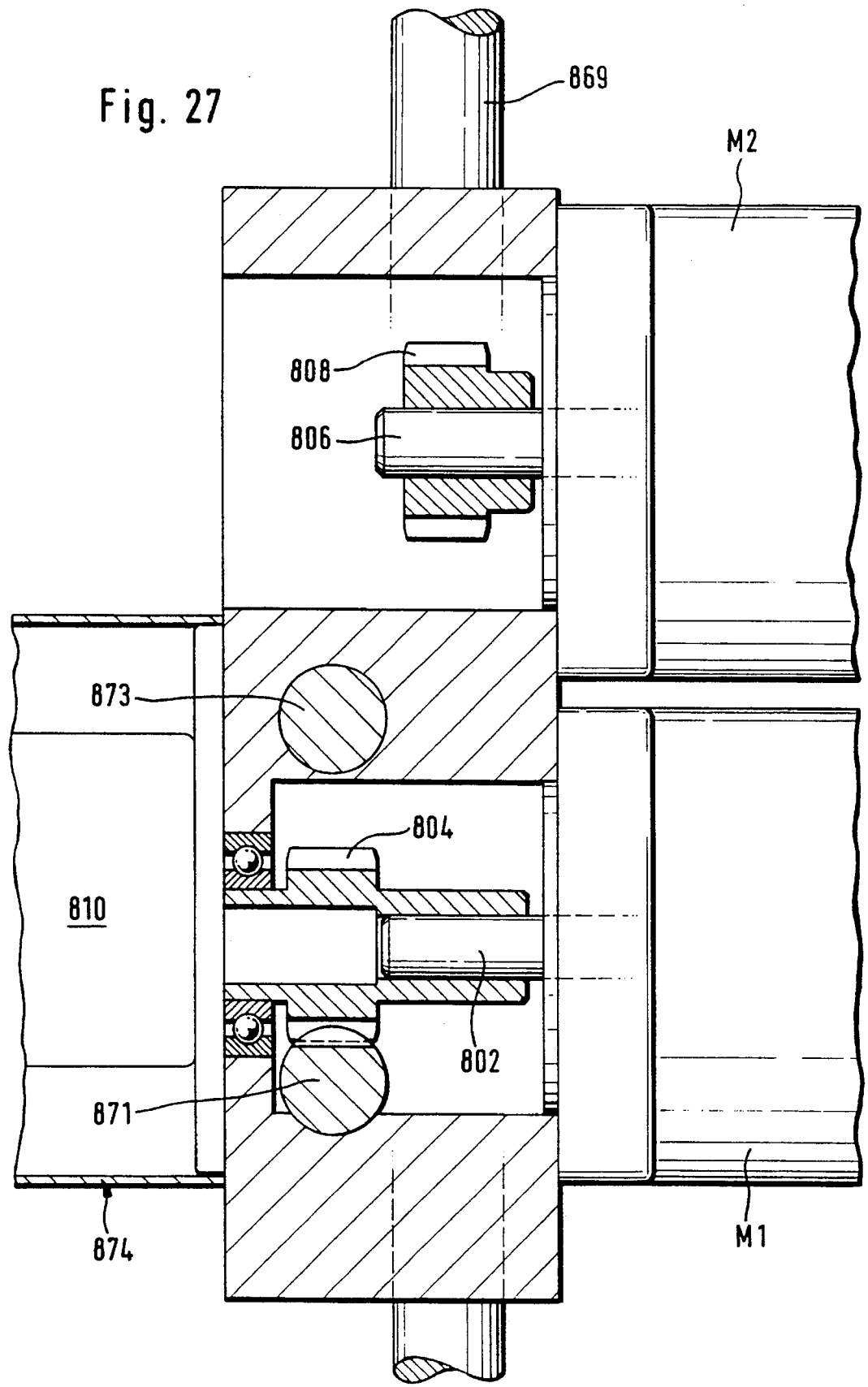
FIG. 27 shows a horizontal section corresponding to XXVII—XXVII in FIG. 23 (rotated by 180°)

The carrier head 872 on the side facing away from the vertical slide 874 carries two drive motors M1 and M2, of which one motor M1 drives a pinion which meshes with the rack 871. The other motor M2 drives a pinion which cooperates with the rack 865 in order to initiate the movement of the carrier head 872 in the direction Z. Details are shown in FIG. 27. It can be seen that the motor M1 carries on its output shaft 802 a pinion 804 which is in mesh with the vertical rack 871. The motor M2 carries on its output shaft 806 a pinion 808 in mesh with the rack 865 which is positioned above it and in parallel with guide 869.

FIG. 27 reveals details of the structure of vertical slide 874. What is shown is a cavity 810 wherein a transmission for transmitting the driving power to the transverse member as well as to the grippers 866 is contained. This transmission shall be described in more detail with reference to FIGS. 23 to 26.

A hollow shaft 812 is received into the vertical slide 874, with this hollow shaft being fixedly coupled with a turntable 814 whereon the transverse member 868 is mounted. The hollow shaft 812 is driven by a motor M3 via a toothed belt 816 whereby the twisting motion (freedom PHI) onto the transverse member 868 may be initiated.

Inside the hollow shaft 812, a centered internal shaft 818 is coupled to a fourth motor M4. The one end of the internal shaft 818 facing away from the motor M4 drives a pulley wheel 820 rotatably mounted on the transverse member 868 (cf. FIGS. 25 and 26), the rotational movement of which may serve to drive the gripper carriers 867. Details of the power transmission can be seen in FIGS. 24 to 26.

Figure 24:
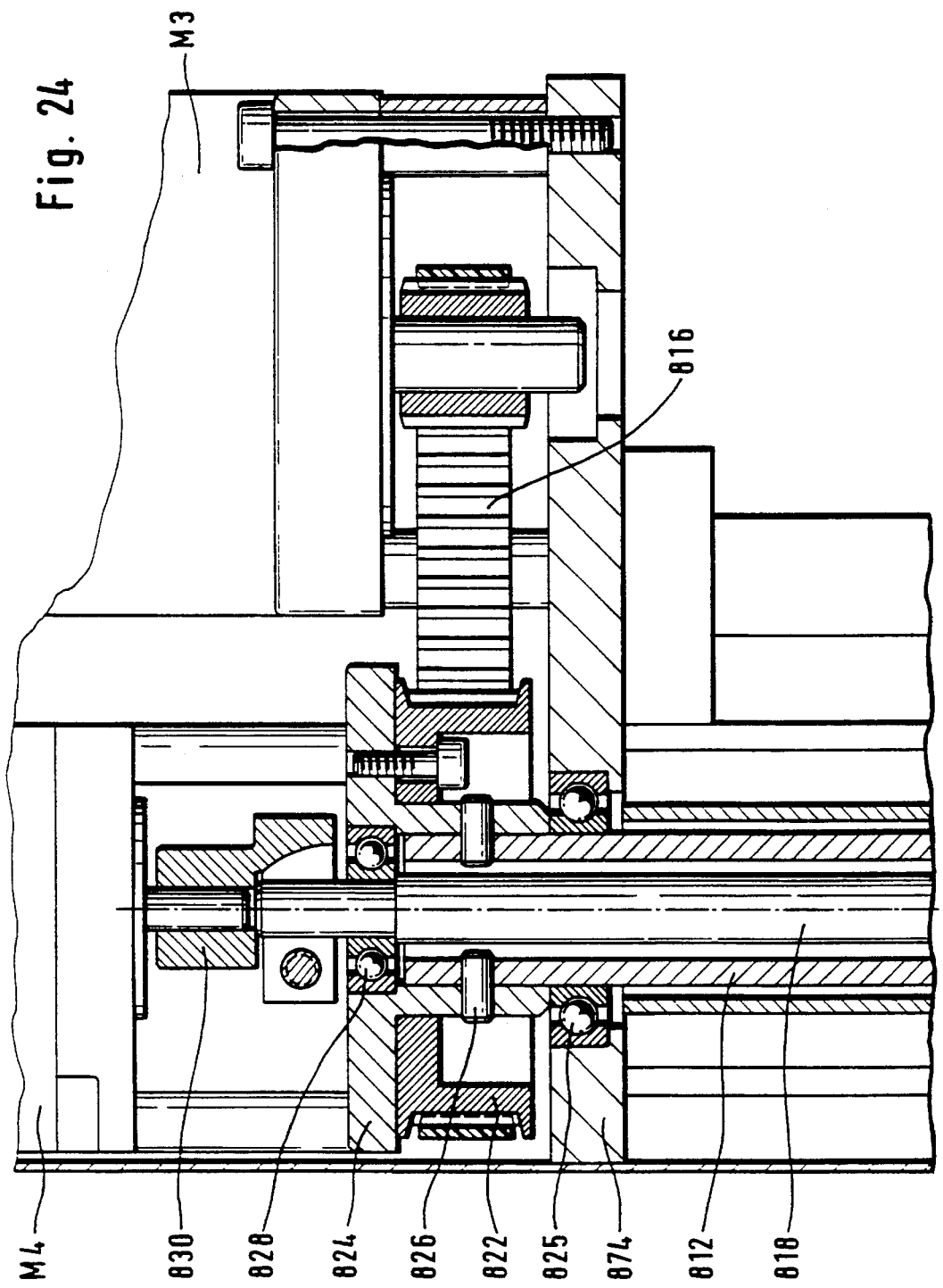
FIG. 24 shows a part sectional view of the drive for a hollow shaft of the device according to FIGS. 22 and 23.

FIG. 24 shows power transmission from motor M3 via a toothed belt 816 to a gear disk 822 fixedly connected to a hub disk 824. Radial pins 826 realize a rotationally fixed connection with the hollow shaft 812 mounted in the vertical slide 874 via bearing 825.

The hub disk 824 in its turn holds the internal shaft 818 via the radial bearing 828, such that the internal shaft is drivable by coaxial motor M4 via the coupling 830.

Figure 25:
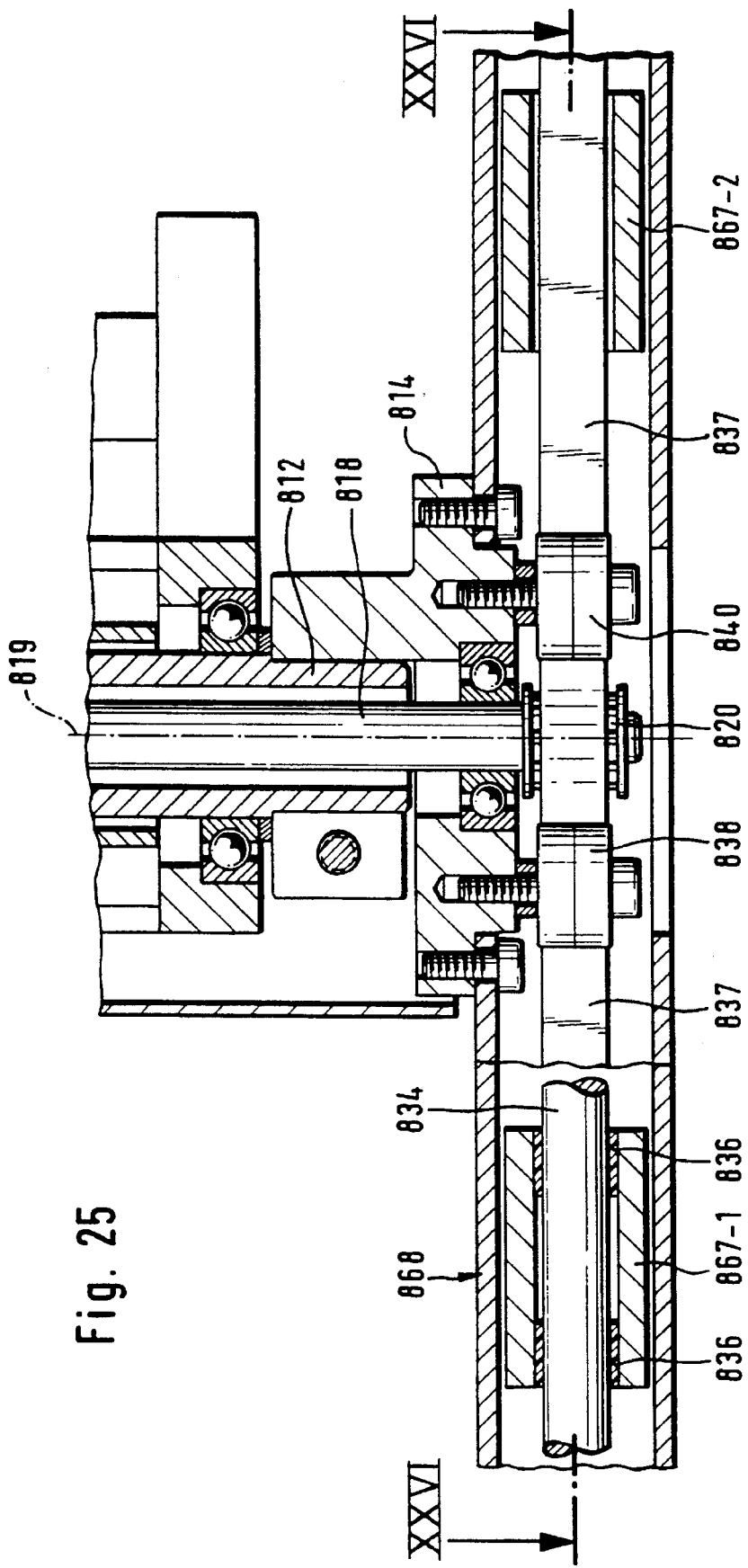
FIG. 25 shows a part sectional view for illustrating power transmission from the internal shaft of the device according to FIGS. 22 to 24 onto gripper slides in the transverse member.
Figure 26:
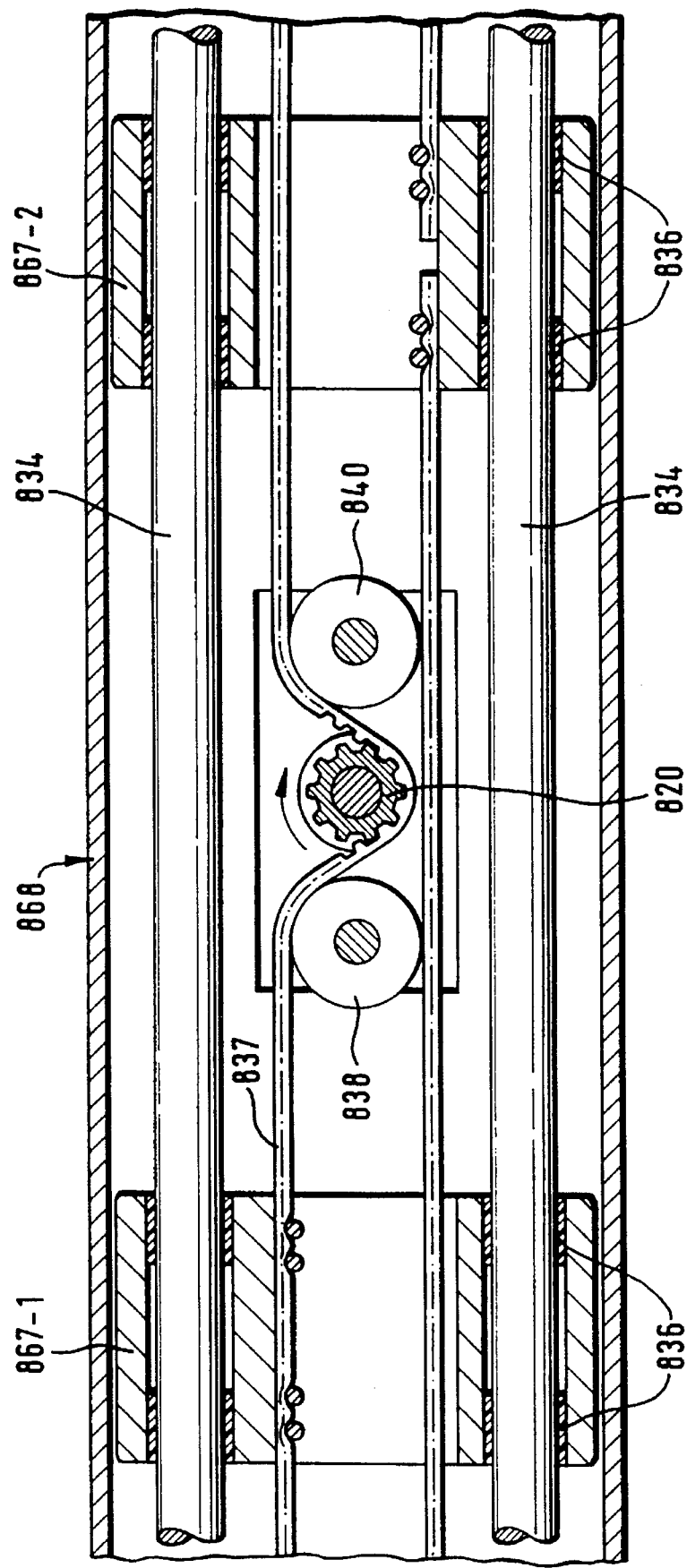
FIG. 26 shows the section corresponding to XXVI—XXVI in FIG. 25.

FIG. 25 shows that the hollow shaft 812 is coupled to the turntable 814 via a coupling piece on the side facing away from motor M3, M4 with the turntable carrying the transverse member 868 via a screwed connection. The representations of FIGS. 25 and 26 show that guide rods 834 are received in the transverse member and guide the carrier panels 867 with minimum friction in X-direction via sliding guides 836. FIG. 26 shows the coupling of carrier panels 867 with the drive or toothed belt 837.

This latter is guided at a possibly large angle of grip around the gear 820, as can be seen most clearly in FIG. 26. For this purpose, deflection pulleys 838 and 840 are provided. One side is coupled to the carrier panel 867-1, while the other side is fastened to the carrier panel 867-2. In this way, the carrier panel 867-2 forms the connecting element for the two ends of toothed belt 836.

Not represented are reversing disks having essentially the same diameter as the disks 838, 840 and mounted on the outer ends of transverse member arms 868A, 868B. It is obvious that during rotation of the toothed belt disk 820, e.g. in clockwise direction, the carrier panel 867-2 is moved according to FIG. 26, and the carrier panel 867-1 is moved to the left in synchronicity therewith. While driven in the opposite direction, the carrier panels inversely move towards each other.

Figure 28:
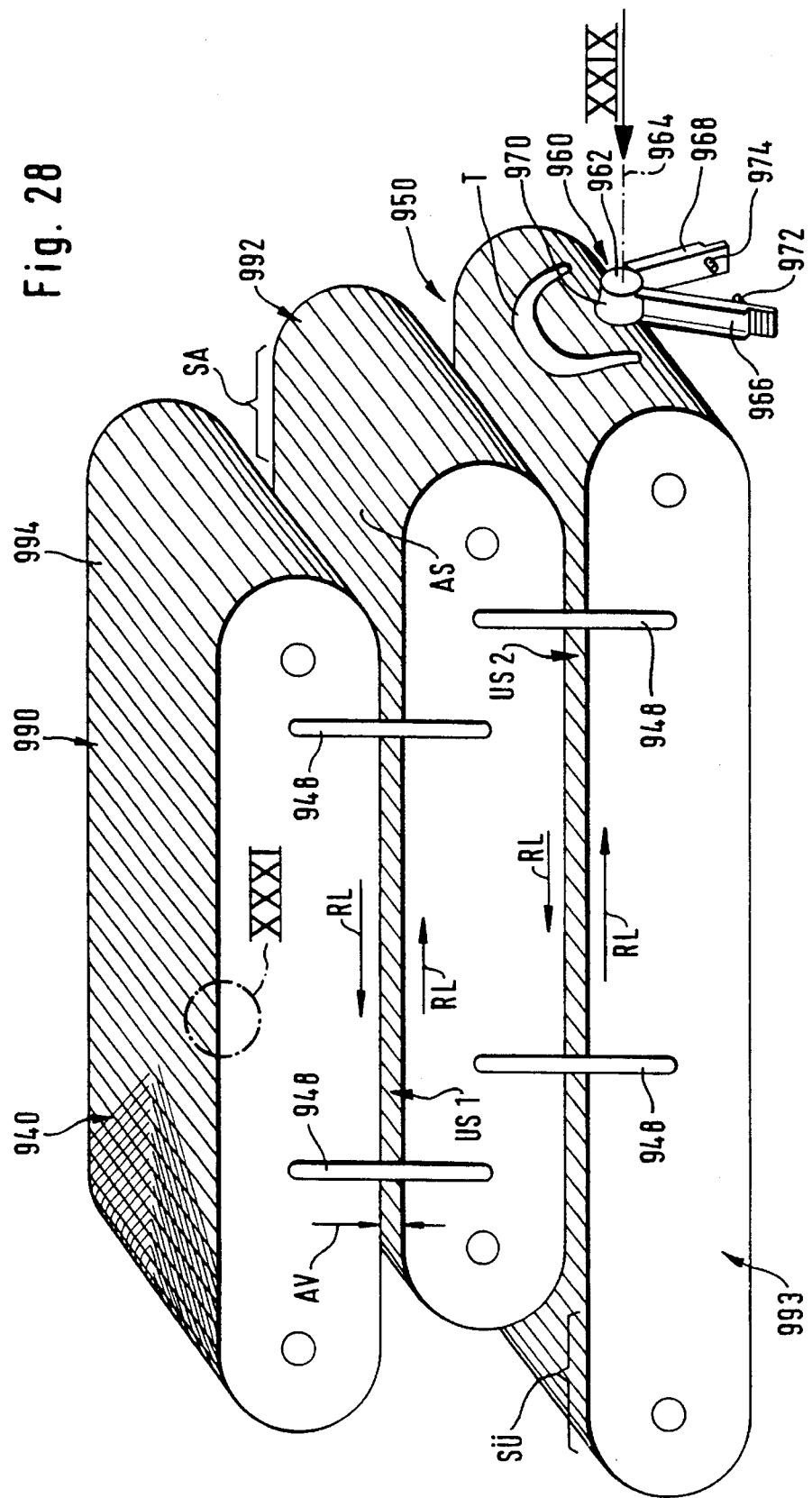
FIG. 28 shows a schematic view of another embodiment of a dough molding means.

In FIG. 28, a modified variation of a rolling device for pieces of dough is shown. Concerning its function, reference may be had to FIGS. 9 to 13 and the pertinent description in order to avoid repetition. In this embodiment, as well, the piece of dough inserted (charging location: AS) as a lump is kneaded into a conveying gap between two surfaces moved towards each other until it has the final dimensions. The surfaces in turn are formed by segmented conveyor belts 990, 992, with two molding sections, namely US1 and US2, being arranged in sequence, however. In other words, the segmented conveyor belts 990, 992 are followed by a third segmented conveyor belt 993. RL indicates the running directions of segmented conveyor belts and it can be seen that in the molding gaps, on the other hand, there are inverse directions of movement of the surfaces facing each other. The segmented conveyor belts 990 and 992 are again axially offset in order to provide a charging section SA. The same is analogously true for conveyor belts 992 and 993, such that a transfer section SÜ is formed whereon the pre-formed piece of dough arriving from the section US1 drops. Thin lines on the segmented conveyor belt 990 indicate a pattern 940 of depressions. These depressions or grooves are molded or worked into the panels 994 and they have an obliquely outward direction, such that the piece of dough is gradually stretched longitudinally in a lateral direction during molding. These grooves or depressions may be produced in a very simple manner particularly when synthetic material panels are used. It can be seen that the panels or bars 994—also cf. FIG. 31—are formed to form a continuous surface 942 in linear movement. FIG. 31 furthermore shows that the panels comprising preceding or following end surfaces 944 and 946 mesh positively whereby their strength in particular against bending may be increased. The central belt 992 moves at a velocity which is only a fraction, preferably one fifth or one eighth, the velocity of the other belts 990 and 993.

Although not represented in the figures, additional measures may furthermore be taken in order to guide the panels 994 by means of lateral and/or central supports such that in certain zones of the roller more or less pressure may be exerted on the dough. For example a wave-shaped pressure may exerted here, or the pressure may be reduced gradually in the outlet zone.

948 designates vertical guides whereby the vertical distance AV may be varied in the transport and conveying gap. Through this height adjustment, thinner or thicker adjustment of the piece of string of dough may be effected. It is also possible to devise the drive for adjusting the vertical distance independently of signals representing the length of the kneaded piece of dough at the outlet 950. If, for example, an insufficient length of the piece of dough T should occur in the area 950, then one of the two gaps AV, or both of them may be reduced in a controlled manner.

Reference numeral 960 refers to a means for fine adjustment of the completely rolled piece of dough T in such a manner that the piece of dough is deposited in precise centering with the plane of symmetry of the gripper assembly. For this purpose a receiving wheel 962 is provided having a rotational drive (not represented) and the axis 964 of which is in the plane of symmetry of the gripper assembly, i.e. of the transverse member. The receiving wheel 962 is associated with two receiving grooves 966, 968 which are pivotably arranged around an axis parallel with the axis 964, such that they form a tangential transition into the surface 970 of the receiving wheel 962. The cross-section of the receiving groove 966 can best be seen in FIG. 32.

972 and 974 refer to sensors preferably operating capacitively, i.e. without contact, whereby the positions of the ends of the string of dough may be sensed or measured when the string of dough drops onto the receiving wheel 962 after leaving the outlet 950 of the molding means. In order to minimize undesirable deformations of the string of dough, the profile of the receiving wheel is adapted to the cross-section of the central portion of the string of dough.

Figure 29:
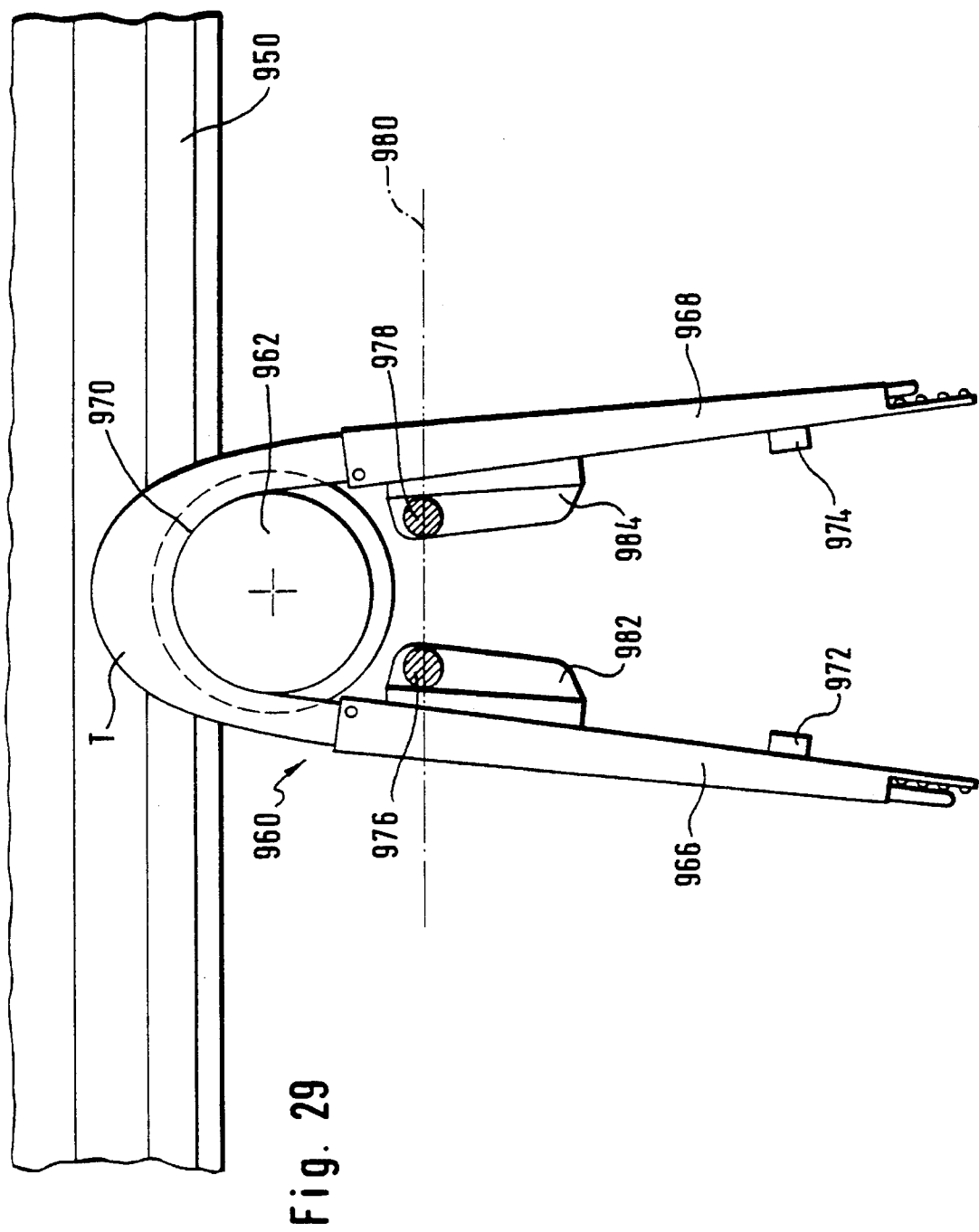
FIG. 29 shows a front view corresponding to XXIX in FIG. 28 (in an enlarged scale)

In an enlarged scale, FIG. 29 shows the positions of the string of dough T and of receiving grooves 966, 968 after arriving on the receiving wheel 962. The string of dough takes a position not precisely centered—shown in an exaggerated manner—on the wheel. The left end in FIG. 29 droops slightly lower than the right end.

In this case, the receiving wheel 962 is initially rotated in one direction by a drive means (not represented) until one of sensors 974 becomes free. At that moment, the drive means reverses the direction of rotation while a counter sums up the movement steps of the drive for the receiving wheel 962 until the other non-contacting sensor becomes free. At that moment, the rotational direction of the drive means and thus of the receiving wheel 962 is again reversed and the wheel is returned by exactly half the number of steps, such that the string of dough hangs over the receiving wheel 962 in a precisely centered position. It is therefore essential that the wheel rotates when one of the non-contacting sensors is triggered by the string of dough until the sensor becomes free and the sensor on the opposite side is triggered.

After this aligning procedure, the two receiving grooves 966, 968 are pivoted upwards, or to the outside, with an inverse control movement—similar to the drive of the grippers—being applied. For this purpose, control bolts 976, 978 are displaced apart from or towards each other along an axis 980. The control bolts cooperate with a connecting link guide 982 or 984, respectively, such that the receiving grooves 966, 968 are gradually brought into the horizontal position shown in FIG. 30. It can be seen that the articulated point of the receiving grooves is positioned such that the central portion of the piece of dough T projects is raised above the receiving surface of the receiving grooves.

On the left side of FIG. 30, a variation of the receiving groove 966 is indicated, with the peculiarity being that the groove is formed by two parts 966A and 966B telescopically guided on each other. The relative shift of the parts 966A, 966B is preferably controlled via the control bolt 976, i.e. via the movement of the control bolt 976 not only the angular position of the receiving groove 966 but also its total length LG is determined. This may be of advantage when the capacitive, i.e. non-contacting sensors or measuring devices determine that the total length of the string of dough is too small for ensuring safe grasping of the ends of the string of dough by the grippers. In this case, the control bolts 976, independently of the sensor measurement signals, are shifted until the desired length has been adjusted. Telescopic shift preferably is also carried out in a curve-controlled manner.

Finally an advantageous embodiment of the ends of receiving grooves 966, 968 is being described by FIG. 32. In this area, a series of nipples 986 are shown to ensure the ends of the string of dough to be safely graspable by the grippers as explained by referring to FIGS. 14 to 19. 988 designates a bore for receiving the position sensor.

The invention thus provides a process and a device for the mechanical production of pretzels, whereby not only the very process of knotting the String of dough but also charging the dough and conveying the raw pretzels are achieved by automated means. A string of dough having a controlled length and spatial orientation is delivered to a pair of grippers of the pretzel knotting station, with the grippers performing a continuous sequence of movements symmetrical to the plane of symmetry of the pretzel in order to draw the grasped string of dough into a three-dimensional loop shape wherein the ends of the string of dough come to lie in the vicinity of the "heart" of the pretzel to be knotted. After the grippers have come to a standstill, they perform a rotational movement through 360° and along the shortest section and are synchronously moved downwards and apart until they come to lie over the desired contact pressure points for the ends of the string of dough on the central portion. In that location, the grippers release the string of dough and press the ends of the string of dough against the central portion of the pretzel in a consecutive lifting and lowering movement. While the grippers are moved on for renewed reception of the following string of dough, the completely formed raw pretzel is transported in free fall and in parallel translation onto a transport device underneath during short-time opening of articulated support wings. The device requires little construction space and no guide plates, brushes, clamps or the like, which positively influences servicing and cleaning of the device.

I claim:

1. Method for the mechanical production of pretzels from a portion of dough, comprising:

shaping a portion of dough into a substantially linear string of dough having ends and predetermined dimensions;

grasping said ends of said substantially linear string of dough by a pair of grippers while said string of dough is in said substantially linear position;

drawing said grasped, substantially linear string of dough into a loop shape with said pair of grippers, with the center of said loop being supported on a support;

positioning said ends of said string of dough above a portion of said loop shape;

knotting said string of dough into a pretzel shape on said support while said ends of said string of dough move 360° relative to said support and said center of said loop by means of said pair of grippers, said ends of said string having an axis of movement essentially perpendicular to said support;

moving said grippers until said grippers are positioned above intended points of pressure contact for said ends of said string of dough onto a center of said pretzel;

pressing said ends of said string of dough onto said center of said pretzel with said grippers;

releasing said string of dough from said grippers and pressure-contacting said ends of said string of dough by means of consecutive lifting and lowering of said grippers;

moving said grippers into a home position for renewed receiving of a subsequent string of dough; and conveying the completely shaped, raw pretzel in free fall parallel translation onto a conveying means underneath said support.

2. The method according to claim 1, further comprising:

supplying said string of dough to a knotting station transverse to the passing direction of a baking support;

buffering the raw pretzels coming from said knotting station in a line, the orientation of which is perpendicular to the advancing direction of said baking support, and the length of which essentially corresponds to the width of said baking support;

moving said line of completely knotted raw pretzels to a buffer support consisting of two pivotably supported wings;

depositing said raw pretzels when said buffer support is completely filled, whereby all of said raw pretzels on said buffer support are simultaneously deposited on said baking support underneath said buffer support; and conveying said pretzels to a next cycle.

3. The method according to claim 1, further comprising passing said baking support along a baking line consecutively comprising fermenting, conditioning, cooling, lye treatment, salting, and baking zones.

4. The method according to claim 1, wherein said shaping of said portion of dough is accomplished by charging said portion of dough into a conveying gap the width of which corresponds to the length of said string of dough to be produced, and stretching and kneading said portion of dough while said portion of dough passes through a conveying and molding apparatus having at least surfaces moving in relation to each other, until said portion of dough has reached the lateral limitation of said conveying gap.

5. Method for producing a string of dough having a predetermined cross-sectional and longitudinal shape comprising:

charging a portion of dough into a conveying and molding apparatus having at least two surfaces completely covering said portion of dough and moving in relation to each other and a conveying gap having a predetermined width defined by lateral limitations which ensures that successive strings of dough which exit said conveying gap have substantially similar lengths; and stretching and kneading said portion of dough while said portion of dough passes through said conveying and molding apparatus, until said portion of dough has reached said lateral limitations of said conveying gap.

6. A device for the mechanical production of pretzels from a portion of dough comprising:

molding means for molding a portion of dough into a substantially linear string of dough having ends and predetermined dimensions;

a pretzel knotting station including a pair of grippers and a support, said support being positioned slightly below said molding means and formed such that said substantially linear string of dough grasped by said grippers is supportable at least at its central portion on said support, wherein said string of dough is substantially linear when grasped by its ends by said pair of grippers and is then knotted into a pretzel shape on said support while said ends of said string of dough move 360° relative to said support and said central portion of said string of dough by means of said pair of grippers, said ends of said string of dough having an axis of movement essentially perpendicular to said support, and wherein said grippers press said ends of said string of dough onto the center of said pretzel;

means for suspending said pair of grippers, said suspension means positioned above said molding means and said pair of grippers being translatable along said suspension means, said suspension means including a separate rotational drive and lifting drive and being carried together with the latter by a retaining head associated with a linear drive having an axis which is perpendicular to the vertical plane containing said string of dough;

transport means disposed underneath said support;

transferring means for transferring said completely knotted raw pretzel from said support onto said transport means in free fall and in parallel translation during opening of wings of said support; and movement control means for initiating the movements of said grippers and of said suspension means, whereby said movements are initiated simultaneously and independently of each other.

7. The device according to claim 6, wherein said transport means is essentially perpendicular to an advancing direction of a baking support, and further comprising an intermediate storage support preceding said transport means, wherein the orientation of said intermediate storage support is perpendicular to said advancing direction of said baking support.

8. The device according to claim 7, wherein said baking support is associated with a stepping drive whereby after the process of simultaneously depositing said raw pretzels said baking support is conveyed on by one timing from said intermediate storage support.

9. The device according to claim 7, wherein said intermediate storage support includes individual wings, each of which comprises a pivoting axis parallel with the axis of said linear drive.

10. The device according to claim 7, further comprising a stepping motor drive.

11. The device according to claim 7, wherein said baking support comprises a conveyor belt which passes through a baking line consecutively comprising fermenting, climate, cooling, lye treatment, salting, and baking zones.

12. The device according to claim 7, wherein said baking support comprises a baking tray associated with a timed forward feed.

13. The device according to claim 6, further comprising a timed drive whereby said completely knotted raw pretzels are consecutively conveyable into a position which is laterally offset relative to a previously deposited pretzel before said wings of said support are opened, and said offsetting is carried out until said intermediate storage support is completely filled.

14. The device according to claim 6, further comprising a depression representing the intended shape of said raw pretzel provided on said support.

15. The device according to claim 6, wherein said rotational drive for said suspension means is associated with a reversing device whereby said 360° rotation may be reversed alternately.

16. The device according to claim 6, wherein said drives for said retaining head, said suspension means, and said grippers work at least pneumatically, electrically or hydraulically.

17. The device according to claim 6, wherein said suspension means is carried by a vertical slide located on a horizontally movable carrier head, said carrier head having two drive motors mounted thereon, whereby the horizontal and vertical movements of said suspension means may be initiated.

18. The device according to claim 17, wherein said vertical slide receives a vertically arranged hollow shaft through which said rotational drive of said suspension means may be initiated and inside which an internal shaft is arranged by which the driving force for inverse or opposite movement of said grippers into the plane of said suspension means may be transmitted.

19. The device according to claim 17, wherein said drive motors of said vertical slide and of said carrier head are effected by means of a rack which is in mesh with drive pinions of said drive motors.

20. The device according to claim 17, further comprising a belt drive for inverse movement of said grippers, said belt drive having a drive gear disposed in the rotational axis of suspension means, and further having a belt which is guided over deflection disks mounted on the outer ends of legs of said suspension means.

21. The device according to claim 6, wherein said molding means comprises a conveying gap disposed between two surfaces of said device which move in relation to each other, and wherein the width of said conveying gap corresponds to the length of said string of dough to be produced and is profiled such that said string of dough which is kneaded to its final dimensions inside said conveying gap fills said predetermined desired cross-section of said string of dough.

22. The device according to claim 21, wherein said two surfaces are driven inversely and at different velocities.

23. The device according to claim 22, wherein said two surfaces are formed by segmented conveyor belts having segments, and further comprising depressions formed in said segments corresponding to the shape to be produced.

24. The device according to claim 23, wherein said segments of said segmented conveyor belts are shaped identically.

25. The device according to claim 23, wherein said segments of said segmented conveyor belts are bars shaped.

26. The device according to claim 23, wherein said segments of said segmented conveyor belts have mutually facing surfaces, and said mutually facing surfaces mesh in a profile in the area of said conveying gap.

27. The device according to claim 23, wherein said segmented conveyor belts form an introductory gap, and wherein the length of said introductory gap is adjustable.

28. The device according to claim 23, wherein said segments are seated exchangeably on conveying chains via chain links.

29. The device according to claim 23, wherein said segments are formed of material selected from the group consisting of steel, synthetic material and aluminum.

30. The device according to claim 23, wherein said segmented conveyor belts comprise upper and lower belts, and wherein said upper segmented conveyor belt is shorter than said lower segmented conveyor belt.

31. The device according to claim 23, wherein said depressions are formed within said segments in an obliquely outward direction, whereby said string of dough may be drawn longitudinally in controlled manner.

32. The device according claim 23, wherein said segments form a continuous surface during linear movement.

33. The device according to claim 23, wherein said segments are associated with a support whereby in selected zones of said conveying gap the pressure exerted on said dough is variable and adjustable.

34. The device according to claim 23, wherein the conveyor belt moving opposite to the production direction moves at a velocity less than the advancing velocity of the conveyor belt driven in said production direction.

35. The device according to claim 23, wherein said segmented conveyor belts comprise three superposed belts offset in the longitudinal direction, such that two passing and molding sections are formed behind one another.

36. The device according to claim 23, wherein the vertical distance of said segmented conveyor belts is adjustable, depending on the output signals of a device measuring the dimensions of the completely shaped string of dough.

37. The device according to claim 21, wherein at least one of said surfaces is formed by a conveyor belt of material supported on a profiled support surface extending over the entire length of a molding and conveying section.

38. The device according to claim 37, wherein said conveyor belt is associated with correspondingly profiled deflection rollers.

39. The device according to claim 37, wherein said surfaces in the area of said molding and conveying section comprise depressions corresponding to the shape to be produced.

40. The device according to claim 37, wherein two conveyor belts are provided to be driven inversely and at different velocities.

41. The device according to claim 21, further comprising a sliding strip provided between said surfaces.

42. The device according to claim 21, wherein said portion of dough molded into predetermined dimensions leaves said molding means transversely to a production direction, and further comprising a receiving wheel arranged at an exit of said molding means, the axis of said receiving wheel being aligned essentially parallel with the transport direction of said string of dough, and said receiving wheel including receiving troughs for receiving said string of dough falling onto said receiving wheel during transport of said dough, and a sensor arranged adjacent to the ends of each said receiving trough, each sensor having an output signal whereby said receiving wheel is rotated until said string of dough is centrally supported by said receiving wheel.

43. The device according to claim 6, wherein said grippers comprise tong bodies movable over said ends of said string of dough from above.

44. The device according to claim 43, further comprising a receiving depression for said string of dough provided adjacent the exit of said molding means, said receiving depression being perforated for passage of said tong bodies.

45. The device according to claim 43, wherein each of said tong bodies comprises several tong prongs in parallel arrangement.

46. A device for the mechanical production of pretzels from a portion of dough comprising:

molding means for molding a portion of dough into a substantially linear string of dough having ends and predetermined dimensions;

a pretzel knotting station including a pair of grippers and a support, said support being positioned slightly below said molding means and formed such that said substantially linear string of dough grasped by said grippers is supportable at least at its central portion on said support, wherein said string of dough is substantially linear when grasped by its ends by said pair of grippers and is then knotted into a pretzel shape on said support while said ends of said string of dough move 360° relative to said support and said central portion of said string of dough by means of said pair of grippers, said ends of said string of dough having an axis of movement essentially perpendicular to said support, and wherein said grippers press said ends of said string of dough onto the center of said pretzel;

means for suspending said pair of grippers, said suspension means positioned above said molding means and said pair of grippers being translatable along said suspension means, said suspension means including a separate rotational drive and lifting drive and being carried by a vertical slide located on a horizontally movable carrier head having two drive motors mounted thereon, whereby the horizontal and vertical movements of said suspension means may be initiated;

transport means disposed underneath said support;

transferring means for transferring said completely knotted raw pretzel from said support onto said transport means in free fall and in parallel translation during opening of wings of said support; and movement control means whereby the movements of said grippers and of said suspension means are initiated simultaneously and independently of each other.

47. The device according to claim 46, wherein said vertical slide receives a vertically arranged hollow shaft through which said rotational drive of said suspension means may be initiated and inside which an internal shaft is arranged by which the driving force for inverse or opposite movement of said grippers into the plane of said suspension means may be transmitted.

48. The device according to claim 46, wherein said drive motors of said vertical slide and of said carrier head are effected by means of a rack which is in mesh with drive pinions of said drive motors.

49. The device according to claim 46, further comprising a belt drive for inverse movement of said grippers; said belt drive having a drive gear disposed in the rotational axis of suspension means, and further having a belt which is guided over deflection disks mounted on the outer ends of legs of said suspension means.

50. The device according to claim 46, wherein said grippers comprise tong bodies movable over said ends of said string, of dough from above.

51. The device according to claim 50, further comprising a receiving depression for said string of dough provided adjacent the exit of said molding means, said receiving depression being perforated for passage of said tong bodies.

52. The device according to claim 50, wherein each of said tong bodies comprises several tong prongs in parallel arrangement.

53. A device for producing a string of dough having predetermined cross-sectional and longitudinal dimensions comprising:

a conveying and molding apparatus having two surfaces which move in relation to each other and completely cover said string of dough and a conveying gap having a predetermined width defined by lateral limitations which ensures that successive said strings of dough which exit said conveying gap have substantially similar lengths, and is profiled such that each string of dough which is kneaded to its final predetermined cross-sectional and longitudinal dimensions inside said conveying gap.

54. The device according to claim 53, wherein said two surfaces are driven inversely and at different velocities.

55. The device according to claim 54, wherein said two surfaces are formed by segmented conveyor belts having segments, and further comprising depressions formed in said segments corresponding to the shape to be produced.

56. The device according to claim 55, wherein said segments of said segmented conveyor belts are shaped identically.

57. The device according to claim 55, wherein said segments of said segmented conveyor belts are shaped like bars.

58. The device according to claim 55, wherein said segments of said segmented conveyor belts have mutually facing surfaces, and said mutually facing surfaces mesh in a profile in the area of said conveying gap.

59. The device according to claim 55, wherein said segmented conveyor belts form an introductory gap, and wherein the length of said introductory gap is adjustable.

60. The device according to claim 55, wherein said segments are seated exchangeably on conveying chains via chain links.

61. The device according to claim 55, wherein said segments are formed of material selected from the group consisting of steel, synthetic material and aluminum.

62. The device according to claim 55, wherein said segmented conveyor belts comprise upper and lower belts, and wherein said upper segmented conveyor belt is shorter than said lower segmented conveyor belt.

63. The device according to claim 55, wherein said depressions are formed within said segments in an obliquely outward direction, whereby said string of dough may be drawn longitudinally in a controlled manner.

64. The device according claim 55, wherein said segments form a continuous surface during linear movement.

65. The device according to claim 55, wherein said segments are associated with a support whereby in selected zones of said conveying gap the pressure exerted on said dough is variable and adjustable.

66. The device according to claim 55, wherein the conveyor belt moving opposite to the production direction moves at a velocity less than the advancing velocity of the conveyor belt driven in said production direction.

67. The device according to claim 55, wherein said segmented conveyor belts comprise three superposed belts offset in the longitudinal direction, such that two passing and molding sections are formed behind one another.

68. The device according to claim 56, wherein the vertical distance of said segmented conveyor belts is adjustable, depending on the output signals of a device measuring the dimensions of the completely shaped string of dough.

69. The device according to claim 53, wherein at least one of said surfaces is formed by a conveyor belt of material supported on a profiled support surface extending over the entire length of a molding and conveying section.

70. The device according to claim 69, wherein said conveyor belt is associated with correspondingly profiled deflection rollers.

71. The device according to claim 69, wherein said surfaces in the area of said molding and conveying section comprise depressions corresponding to the shape to be produced.

72. The device according to claim 69, wherein two conveyor belts are provided to be driven inversely and at different velocities.

73. The device according to claim 53, further comprising a sliding strip provided between said surfaces.

74. A device for shaping of an elongated piece of dough having predetermined dimensions comprising:

molding means for molding said piece of dough into said predetermined dimensions;

a receiving wheel arranged at an exit of said molding means, the axis of said receiving wheel being aligned essentially parallel with the transport direction of said piece of dough, said receiving wheel including receiving troughs for receiving said piece of dough falling onto said receiving wheel during transport of said dough; and a sensor arranged adjacent to the ends of each said receiving trough, each sensor having an output signal whereby said receiving wheel is rotated until said piece of dough is centrally supported by said receiving wheel.

* * * * *